United States Patent [19]
Kriens et al.

[11] Patent Number: 5,864,862
[45] Date of Patent: Jan. 26, 1999

[54] SYSTEM AND METHOD FOR CREATING REUSABLE COMPONENTS IN AN OBJECT-ORIENTED PROGRAMMING ENVIRONMENT

[75] Inventors: Peter Kriens, Ljungskile, Sweden; Stefan B. Eissing, Laer, Germany; Bengt Häkan Björk, Mölndal, Sweden

[73] Assignee: Telefonaktiebolaget LM Ericsson (publ), Stockholm, Sweden

[21] Appl. No.: 724,553

[22] Filed: Sep. 30, 1996

Related U.S. Application Data

[60] Provisional application No. 60/005,495 Oct. 16, 1995.
[51] Int. Cl.$^6$ ........................................ G06F 17/30
[52] U.S. Cl. .................. 707/103; 707/101; 707/102; 395/683; 395/685
[58] Field of Search .................... 707/103, 101, 707/102; 395/683, 685

[56] References Cited

U.S. PATENT DOCUMENTS

| | | |
|---|---|---|
| 5,235,701 | 8/1993 | Ohler et al. ........................ 395/600 |
| 5,291,583 | 3/1994 | Bapat ................................ 395/500 |
| 5,295,222 | 3/1994 | Wadhwa ............................ 395/703 |
| 5,339,430 | 8/1994 | Lundin et al. .................... 395/685 |
| 5,369,766 | 11/1994 | Nakano et al. ................... 395/685 |
| 5,437,025 | 7/1995 | Bale et al. ........................ 707/103 |
| 5,684,955 | 11/1997 | Meyer et al. ..................... 395/683 |

*Primary Examiner*—Thomas G. Black
*Assistant Examiner*—Jean R. Homere
*Attorney, Agent, or Firm*—Jenkens & Gilchrist, P.C.; Thomas L. Crisman; Anant S. Narayanan

[57] ABSTRACT

A novel object called the Data Object is used to represent different information types in a system in a singular way in an object-oriented programming environment. The Data Object stores the value of the information and a reference to an object that handles that specific type of information. All requests on the Data Object are forwarded to this handler. The interface allows programmers to query the structure of the information, place constraints on values and names of the parts. This makes it possible to write code that performs a service that adapts itself to whatever Data Object it gets. The use of a Data Object significantly minimizes the coupling between modules and make reusable code easier to develop because each object class in the object-oriented software system is now coupled only to the Data Object class.

18 Claims, 19 Drawing Sheets

FIG. 23

Only 4 Interface Categories
Numeric::= Enum | Boolean | Number
String::= String (Binary + Readable)
Indexed::= Structure | Array | Choice | Bit String
Labeled::= Structure | Choice | Bit String | Enum The MetaType class is abstract and throws an exception when a method is not implemented in the subclass A Label describes a field

- 2311 Application
- 2301 Data Object — value — Value is interpreted by MetaType at all times
- 2310 MetaType — name min/max/help
- 2335 Label — field Name optional *default* Value
- 2324 Labeled labels
- 2323 (branch)
- 2322 Number — Value is a number
- 2321 String — Value is a reference to a string
- Array — Arrays consist of n data objects. Value is a pointer to a list
- 2334 Bit String — Value is an array of INTEGER Data Objects
- 2333 Enum — Value is reference to the selected label
- 2332 Structure — Value is an array of Data Objects
- 2331 Choice — Value is a Data Object of the selected type and pointer to the selected label ASN.1, X.128 Meta Type Languages

SYSTEM AND METHOD FOR CREATING REUSABLE COMPONENTS IN AN OBJECT-ORIENTED PROGRAMMING ENVIRONMENT

PRIORITY UNDER 35 U.S.C. § 119(e) & 37 C.F.R. § 1.78(a)(1)

This Nonprovisional U.S. Patent Application claims priority from Provisional U.S. Patent Application entitled SYSTEM AND METHOD FOR DECREASING COUPLING BETWEEN FUNCTIONS AND ACTUAL DATA TYPES, Ser. No. 60/005,497, filed on Oct. 16, 1995 in the names of Peter KRIENS, Stefan EISSING and Håkan BJÖRK, who are also the inventors of the present application. The earlier-filed Provisional U.S. Patent Application is currently pending and has not been abandoned.

CROSS REFERENCES TO RELATED APPLICATIONS

This Nonprovisional U.S. Patent Application is based upon an earlier-filed, currently pending Provisional U.S. Patent Application entitled SYSTEM AND METHOD FOR DECREASING COUPLING BETWEEN FUNCTIONS AND ACTUAL DATA TYPES, Ser. No. 60/005,497, filed on Oct. 16, 1995, in the names of Peter KRIENS, Stefan EISSING and Håkan BJÖRK, who are also the inventors of the present application.

This Nonprovisional U.S. Patent Application also contains subject matter related to an earlier-filed, currently pending Provisional U.S. Patent Application entitled COMPONENT DECOUPLING, A KEY TO IMPROVING SOFTWARE SYSTEM ARCHITECTURES, Ser. No. 60/005,337, filed on Oct. 17, 1995, in the name of Tony I. LARSSON. This currently-pending Provisional U.S. Patent Application and any Nonprovisional Patent Applications deriving therefrom in the U.S. or in other countries and the disclosure(s) contained therein are all hereby incorporated by reference herein.

The earlier-filed Provisional U.S. Patent Application(s) identified above and the present Nonprovisional Patent Application have all been or will be assigned to Telefonaktiebolaget LM Ericsson (publ).

DESCRIPTION

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

1. Technical Field of the Invention

The invention relates to the field of computer programming languages, methodologies and systems, and more particularly to a system and method for decreasing coupling between functions and actual data types in an object-oriented programming and execution environment, such as a telecommunications environment.

2. Description of Related Art

The software industry has been trying to improve the process of software development since the first day the computer was invented. An example of this is the structured design paradigm that started in the 1960's and introduced decomposition by function. Though still useful, the function-oriented approach is being replaced by the object-oriented paradigm that decomposes the problem domain into objects. This paradigm shift has resulted in languages like C++ that attempt to facilitate the exploitation of these ideas in the language, minimizing the gap between analysis, design and implementation.

Two principal problems associated with object-oriented designs, especially those implemented in the C++ programming language, are those of tight coupling and of the explosion of classes. These result from the fact that objects invoke the services of other objects and because each object type needs to be represented as a new class. Whenever some objects invoke other objects, object-oriented software becomes difficult to maintain because a tangled web of relations is created in the source code. The resulting software maintenance problem becomes even larger if there is an increase in the number of classes. These problems are especially visible in network management software where the managed objects have traditionally been represented by a plethora of classes.

The existence of different types make it very hard to create generic (i.e. reusable) code. For example, storing a Shape object in the database requires almost the same kind of code as storing a Car object. Yet, unless these two objects share a common base class and the software designer had anticipated the provision of a service at the time of designing the software, there is no easy way to define the necessary code in a single place.

Prior to a detailed consideration of the coupling problem, it is useful to briefly review the antecedents of the object-oriented programming paradigm and provide a glossary of terms as used in this patent application.

The Object-Oriented Programming Paradigm

Object-orientation has often been advocated as the panacea for designers of software systems. However, in order to fulfill basic architectural requirements, large software systems still need additional means for decoupling their components. The component decoupling techniques disclosed and described in this patent application can also be used to design and develop efficient distributed software solutions.

The term object-orientation has been used to describe a variety of programming concepts and advances. At its core, the term object-orientation is usually taken by those skilled in the art to refer to a computer programming environment that has three principal characteristics. First, communication between various objects is performed by passing messages. Second, the programming environment distinguishes between data types and instances of those data types. Third, the similarities between various "objects" can be (and often is) characterized using the concept of inheritance.

Some of the limitations of the object-oriented approach as presently implemented in various software programming systems can be best understood by considering first the history and roots of the object-oriented approach.

We have moved from the function-oriented approach used in the early days of software programming to the object-oriented approach today. Function-oriented analysis was (and is) based on a top-down (or black box) view of system requirements. In real-time applications such as telecommunications, such an analysis focuses on the functions or services provided to external clients and is implemented as processes distributed over a telecommunications network.

In contrast, software engineers often focus on algorithm control structures, on data structures and on data transformation methods. In the function-oriented approach, as understood by skilled software engineers, data is usually considered as being global, although in some instances data maybe encapsulated. Consequently every change in the representational format of a datum immediately feeds back into the design of every function that manipulates that datum.

This disadvantage can be ameliorated somewhat, by manipulating the data indirectly, i.e., by manipulating the data symbolically or by using a specialized interface function that serves as a filter. The use of such interface functions can also permit modification of the representational format of the data and can be used to obtain an abstract view of the data. Thus, choice of a proper software architecture model can avoid or eliminate many of the problems that are often associated with the function-oriented approach to software design.

The function-oriented approach is most commonly used nowadays to manipulate information contained in databases. Each database management software program often uses an abstract information model that isolates the data representation from its manipulation. However, the internal structure of the database is not accessible to an end user who invokes standard functions to manipulate the information contained in the database.

In contrast to the function-oriented approach which focuses on functions that transform or manipulate external or global data, the object-oriented approach advocates an inverted, more structure-oriented or implementation-oriented view of the world, that focuses on objects that are represented by data and applicable functions.

This approach, which is achieved by separating the function-naming parts of messages (including their intended interpretation) from the implementation of the function, makes it possible to encapsulate and hide the data representations that are used in a specific implementation. Thus, this approach (which is a desirable aspect of an object-oriented system although it is relatively independent of the object-orientation paradigm) requires both the message-names as well as their meaning (which constitute the communications means between objects) to have stable definitions.

Glossary of Terms

Preparatory to describing the details of the present invention, the following glossary of terms is provided to assist in clarifying the meaning of key terms and concepts as used in this nonprovisional U.S. patent application.

Type: A type, or more specifically, a data type is a programming language concept that is used to put a meaning on data that is stored in memory of a computer. In computer memory, all data is usually stored in binary form, i.e. as zeroes and ones. However, the processing unit of the computer interprets and uses these zeroes and ones depending on the type that has been assigned in the source code to the stored constant, variable or object. A processor handles pointers, integers and floating-point numbers differently, even if their representation in memory is identical.

A programming language extends this concept by allowing a programmer to construct new user-defined types from a list of types that are either known to the processing unit or defined as primitive types in the programming language. Providing for the creation and manipulation of a set of user-defined types permits an user to attach a specific meaning to data so that it becomes easier to work with. Instead of having to work with the parts of an object (i.e. in terms of native or primitive types), a programmer can work now with the whole (i.e. in terms of higher-level structures).

The concept of "type" in a programming language represents at least two important notions. First, a type defines the interpretation of raw bits in a computer's memory. The raw memory bits (i.e., the binary values in an area in the computer's memory) when interpreted in light of the data type that they represent are called instances of data type. There can be many instances of each single type. A data type defines both the behavior as well as the memory storage format of its instances. This can be expressed in set-theoretic terms by the relationship:

Type=Instance Memory Layout+Behavior

The type of a datum can be used as a filter to decide how raw data should be treated. A type is thus a classifier of a collection of values. In practice, type systems for programming languages provide a weak interpretive filter for system programming to permit access to machine representations of data but provide a much stronger filter for application programming to model phenomena at a high level of abstraction.

A programming language uses types to constrain and select the operations that are permitted on actual values of the types. For example code that calls for the addition of two integers will result in the selection of the correct machine instructions for the addition of integers. Code that calls for the addition of an integer and a string will be flagged as an error. Such decisions are based on the types of the data and not on their value.

Each programming language defines a set of fundamental types. Fundamental types can be either primitive or constructed. Typically, the behavior of fundamental types is fully defined and limited by the programming language. Primitive types are usually dictated by the programming language and the architecture of a machine while constructed types are normally aggregations of other types, both primitive and constructed. In most machines having serial architecture (i.e. machines having serially organized memory addresses), the primitive types are scalars, e.g., numbers, pointers and strings. The operations on primitive types are usually directly implemented as native instructions on the machine.

Most programming languages also provide for the recursive construction of user-defined types from the set of fundamental types. The names and characteristics of five fundamental types as presently used in the C and ASN.1 programming languages are shown in TABLE 1 below. For each of these five fundamental types there are unique rules well known to those of ordinary skill in the art that define how data belonging to that particular type is to be treated by various software program units or modules.

TABLE 1

The Five Fundamental Types

| Basic Type | Characteristics | C Name | ASN.1 Name |
|---|---|---|---|
| String | Variable length data | char* | OCTET STRING |
| Number | Value or Magnitude | float, int | INTEGER |
| Array (Type) | A list of a single type | [ ] | SEQUENCE OF |
| Structure (Types) | A list of one or more types | struct | SEQUENCE |
| Union (Types) | One of a list of types | union | CHOICE |

Programming systems also allow programmers to extend simple types by defining user-defined types based upon the fundamental types defined in a programming language. These user-defined types are constructed from the simple types using a set of rules. The construction rules and the behavior of instances of the types created using the construction rules are typically specific to and defined by the programming system.

There are only a few common ways for creating higher-level aggregations. However the rules for creating these aggregations are usually permitted to be applied recursively. This provides a software developer with the power to create a multitude of user-defined types. The three most commonly found constructed (user-defined) types are the ARRAY type, the STRUCTURE type and the CHOICE type.

Arrays are types that consist of a list of zero to n elements where all the elements are instances of the same type. Array types are used to permit indexed access to one or more of its elements using a numeric index. In the ASN.1 programming language, Arrays are denoted by the reserved words "SEQUENCE OF" or "SET OF". In the C++ programming languages, an Array is both defined and invoked using the "[ ]" operator that can be applied to other types also.

Structures are types that consist of a named list of n elements that can each be of a different type. Thus, structures can be viewed as nonhomogeneous arrays. The length of the list, n and the names of the elements of the list are defined by the actual type. The structure type permits access by name to any of its elements. In the ASN.1 programming language a Structure is called a "SEQUENCE" or a "SET". In the C++ programming language, a Structure is called a "struct". In the PASCAL programming language, a Structure is called a "Record".

The Choice type permits an user to specify an initial set of user-defined types. Instances of a Choice type are, at any given instant, bound to one of the initially specified set of types. However, they can be converted to any of the other types at any time. Often, an instance of a Choice type reserves a block of memory in the computer system based upon the size of the largest type. This type is indicated in the ASN.1 programming language using the keyword "CHOICE", in the C++ programming language as an "union" and in the PASCAL programming language as a "CASE record." Access to information in a UNION is performed by selecting the specific name that was prespecified for the type.

The ANY type is a type that accepts any possible value. This type has very different behavior in different programming systems. In C++, the behavior of the instruction "void *" is close to that of the ANY type. However, the language does not specify the behavior of the pointer. In Smalltalk, every object is ultimately derived from object (i.e. every object inherits from the class object) thus obviating the need for the ANY type as every variable can be of any type. The 1994 standards for the ASN.1 programming language discourages the use of the ANY type and has suggested instead that a method be used to relate a desired type to the value of an attribute.

New types can also be created in most modern programming languages by renaming or extending a type. As can be expected, a new type created by the renaming technique will have the same behavior as the original type. In the ASN.1 programming language this is handled by assigning the name of the old type to the new type name. In the C++ programming language, this is handled by using the "typedef" operator.

In object-oriented programming environments, two new construction rules are now increasingly present. These type-extension rules permit types to be associated with functions that are local to the type and also permit types to be derived from other types and then extended. In contrast to non object-oriented systems where the behavior of the instances of a type are defined only by the programming system, object-oriented programming environments permit the behavioral part of a type to be defined by the programmer.

For historical reasons, object-oriented systems have used slightly different terminology to refer to the same concepts. Types having local functions are often called "classes" while the local functions are referred to as "methods". Similarly, the derivation of one type from another type and its extension later is called inheritance.

In an object-oriented programming language, a type can be extended with user-defined functions that operate on values of that type. After such an extension of a type, a distinction can be drawn between the data type (i. e. the structure and representation of the information in memory) and the class to which the type belongs. A class contains a data type.

Object: The term object is often misused and misunderstood. In the context of the present patent application, an object is defined as an entity that has the ability to maintain information about its state and which provides a number of predefined operations to either examine or affect this state. The predefined operations specify the behavior of the object. Objects can be used to correspond to an entity in the real world and act as the representative of that entity inside a software application program. For example a Subscriber object can be used as a repository for the information about a real person as is necessary for subscription management system. However, objects are not limited to real entities but can also be used to represent or encapsulate more abstract concepts.

An object is an instance of a class. Normally an object is a reference to (i.e. it has a pointer to) the actual data. It is usually the responsibility of the programming system to make sure that this data is manipulated in conformity with the rules as set out in its class definition. Note that each class can be associated with several instances.

Class: Objects that have common characteristics can be grouped into a class. For example, the objects that represent the subscribers "Stefan", "Håkan" and "Peter" are different objects even though they may share a common behavioral (functional) definition and memory layout. A class can be defined as the template for multiple objects and describes the internal structure of these objects. Objects belonging to the same class share the same definition for both their operations as well as for their information structures.

A class is sometimes referred to as the type of an object. However, the terms type and class are not synonymous. A class can be viewed as the implementation of a type. The class concept can be considered as an abstraction that describes the common characteristics of all the objects belonging to that class.

The concept of class extends the idea of assigning types to constants, variables and objects by defining the expected behavior of instances of the class. Each class consists of a data type definition and an associated set of functions called methods. The data type of a class is usually hidden from an user or invoking function and can only be manipulated through the methods defined for that class. The methods of a class hide any changes in the data type from an user and therefore the use of a class definition can minimize dependencies between software units.

In the object-orientation paradigm, a class is further understood to permit inheritance, as illustrated in FIG. 1. It should be noted that a filled black circle is used in the figures to denote that the linked objects have zero or more object relationships. Hollow circles are used to depict situations where there is either zero or one object relationships. Where the objects have a one-to-one relationship, they are shown linked by a line without either a filled or a hollow circle at either end. The concept of inheritance permits new classes to be defined based upon other, earlier-defined, classes. Each such derived or inherited class can extend or modify the data type of a parent class and can also add to or override methods that were defined in its parent class.

Inheritance is commonly achieved by relating one or more specific objects to a more general object as shown in FIG. 2. The notion of inheritance attempts to identify common denominators or invariant parts of the object partition domain and permits reuse of some of the invariant characteristics by relating each specialized object to a generic object class.

For example, the objects "Postscript Printer" 221 and "PCL Printer" 222 may be classified by relating it to the object class "Abstract Printer" 211 by an attribute or relationship called "class". This type of relationship is usually indicated in an object-oriented programming language by using the declarative prefix "kind_of," "specialization_of," "is_a," etc. The class "Abstract Printer" 211 may be invoked by a different class called "Editor" 201 and so on as shown in FIG. 2. Thus, the class "Abstract Printer" 211 is an instance of the super class "Editor" 201 while the objects "Postscript Printer" 221 and "PCL Printer" 222 are instances of a sub-class of the "Abstract Printer" class 211.

Instance: An instance is an object created from a class. While a class describes the behavior and information structure of an instance, the current state of the instance is defined by the operations performed on the instance. For example, a subscriber "Stefan" would be represented as an instance of the class "Subscriber" that maintains the state of the instance "Stefan" to the extent it is relevant to the application domain, e.g. the amount outstanding from Stefan at the current time.

In an object-oriented system, each object belongs to a single class. An object that belongs to a certain class is called an instance of that class. The terms "object" and "instance" are often used synonymously.

Polymorphism: When an operation on an object can defined in such a way that the class of the object is not constrained to a single class, the operation is said to be polymorphistic. For example, as shown in FIG. 3 when a function is responsible for printing the representation of an object, the function can command the object to print itself on a console. In such a case, the print operation is forwarded to the actual class of the object to be printed so that object will be accurately printed without the requester or client becoming aware of the actual class of the object.

Polymorphism permits the executor of an operation on an object to do so without knowing the actual class of that object. Some programming languages, e.g., C++ and Java restrict the implementation of polymorphism in order to ensure that a receiving object is actually capable of performing the operation. Other languages like Smalltalk are fully polymorphistic but are capable of detecting operations that are missing for a certain class only at run-time.

Polymorphism is a crucial to creating reusable code. A function whose functionality can be expressed in a series of polymorphistic operations on an object can be reused for (or by) objects belonging to a different class.

For example, an editor needs to be capable of printing a document on a printer. Unfortunately, printing on a Postscript printer is considerably different from that on a PCL printer. Thus a neophyte software programmer may erroneously conclude that this now means that the editor needs a separate print function for each different printer type.

However, the Postscript printer can described in one class while the PCL printer can be described in another. Each class then defines the same operations but implements these operations for a target printer. Now the editor can send the same operations to a single printer object where the actual class of the data will determine whether the object will execute the PCL or the Postscript functions. In this manner, the Postscript printer can be viewed as reusing the editor. This is illustrated in FIG. 2.

A well-designed object-oriented programming environment would implement and exploit polymorphism to minimize the effort needed to build and maintain a software system. The subject invention described in this application exploits and builds upon the polymorphism technique.

Inheritance: Classes can share the common aspects of their behavior by using the description of another class as a base class and then extending or specializing this base class. The behavioral extension can be done by adding more operations, by overriding certain operations or by extending the state information of the objects in the base class.

A class that inherits its behavior from another class can be used everywhere the original class could have been used, but can have different effects upon the same inputs than the base class because of polymorphism.

Meta-Type: A data type is a programming system concept that is normally known only to a compiler. Information about the data type used in a program is not normally part of the retained context during the execution of a software program in most object-oriented programming languages. Data type information is used by the programming system only to select the appropriate machine instructions for the machine on which the program must be executed.

Some programming languages may maintain information about the types used in the program. Such languages are called reflective programming languages because they allow their own structure to be reflected. Smalltalk, CLOS and Java are examples of fully reflective programming languages while the C++ programming language offers only rudimentary capabilities for reflection. Reflective programming languages permit the structure of a data type to be described using yet another data type, or even better, by a set of classes. Each basic data type in a reflective programming language has its own class that specifies how instances of that fundamental data type are to be handled.

The information about types needs to be represented in a class if it is to be available during the execution of the program. Such a class that describes a type to the programming system is called a meta-type class. Instances of a meta-type classes are called meta-types.

Meta-type classes are also ordinary classes and their instances are also ordinary instances allowing the full range of possibilities of the programming system. Thus, for example, it is possible to store a meta-type object in the database and also to print it. The difference between ordinary types and meta-types is that the latter maintain information about information. During the execution of a program, these meta-type instances can be used to manipulate the data and can be queried by the program.

Meta-types have not hitherto been common in current software development practice except with database applications and in high-end research. In one aspect, the present invention can be viewed as a meta-type system where the information about types is used to automate many laborious tasks that are currently done manually by software developers.

Front-End Class: A front-end class is a class that offers a standard view on one side, but distributes all requests for action to another class. The decision as to which class should be invoked for action can thus be deferred until execution time instead of having to be resolved at compile time.

Abstract Meta-Type: An abstract meta-type class defines the methods that all type classes are required to implement. In the C++ implementation of this concept, all type classes inherit from this abstract type class. This class is called an abstract meta-type class because this class does not handle any specific data type itself, but only defines the functions that are needed to handle any possible data type.

Application Program Interface (API): An Application Program Interface (API) describes the data types, classes and functions that a programmer can use in designing a software system, module or unit. This description is often done in text and in computer readable form. For example in C++, APIs are described in so-called header files that serve to inform the compiler about all the relevant constructions that are permitted. The compiler uses this information to check the API rules to the greatest extent possible.

Enhancing the Reusability of Computer Software

It has been anticipated that the advent of object-oriented software development will increase the reusability of computer software. However, in reality, it has proven very hard to fulfill this expectation. One of the reasons for this shortcoming is the rather unexpected fact that object-oriented software development has in some cases actually reduced the reusability of code because of the tendency of the object-orientation paradigm to result in software systems where there is tight coupling between source code elements or parts. Thus it is common to find that realizations of object-oriented software systems consist of several software components or parts that are directly or indirectly coupled to other parts of the system. As used herein, the term "part" refers to a function, a class, or a template, etc. in a specific computer system.

The two principal impediments faced by C++ programmers in trying to create reusable code are the very close coupling between different objects in a software system and the presence of too many classes. This results in several problems.

The principal problem deriving from the increased coupling between objects and the explosion in the number of classes is the greater dependency between objects. This means that if one object changes, many other objects may need to be recompiled or even adapted. Additionally, reuse at the object level becomes difficult because objects are not stand-alone. The inclusion of one object in a software system requires the inclusion of all other objects that are coupled to it.

Further, software designers often base their work on the prior efforts of others. This introduces time delays whenever the coding, development or debugging of a critical component falls behind schedule and additionally makes it hard for software designers to work in parallel. Also, existing functionality often needs to be rewritten because it is not standard design practice to engineer software code to work with new object types. Last but not least, the problems of coupling and class explosion lead to volatility of design. Small changes in functional requirements often require substantial redesign of a software application program because changes ripple through many objects.

These problems are amplified in a programming language like C++ that attempts to abstract the conceptual object-oriented model, while requiring an extreme tight coupling at the implementation level. Many of these problems arise when objects perform various services for other objects. The implementation of these services often necessitates a coupling to other objects. For example, a Subscriber object that needs to be able to store itself, will often be coupled to a Database object. An application that requires the Subscriber object but not the Database object, or an application that requires a different Database object will have no other choice but to first replicate the code and then to modify it.

Implications of Coupling and Deficiencies of Present Solutions Thereto

Coupling in object-oriented software systems has two undesirable side effects: inclusion and exclusion. Inclusion refers to the effect in object-oriented software systems when the granularity of reuse becomes too large. Thus, if a part of a software system is coupled to most of the remaining parts in that system, then reuse can take place only at the level of the complete system. Thus in order to reuse a part of the system one would need to include all parts of the system.

As would be appreciated by one skilled in the art, inclusion occurs when a part A requires the presence of class B in the system. In such a situation, not only does part A couple itself to class B, it also indirectly couples itself to all parts that B couples to. In graph-theoretic terms this concept can be expressed by the relationship:

$$\text{Included}(A)=\Sigma(B+\text{Included}(B)) \quad (1)$$

It has been found that the dependency network that results is very hard to keep under control in the absence of strict rules. The use of a commercial class library illustrates the inclusion problem: in most cases, using one small part of the library often requires the inclusion of all of the library because the small part reuses or invokes the remainder of the library.

The other consequence of coupling, exclusion, arises when a software component or part has the capability of performing a function on more than one component or part, but is restricted because of the coupling to commit itself to performing the function on a single type for a specific part. Although it is true with traditional object-oriented programming languages (such as the C++ programming language) that a function A that performs a set of operations on part B requires only the operations applicable to B, it has traditionally been a constraint that once A names B as the operand, A cannot thereafter be reused for an independent part C, even when C might implement the required set of operations. Thus exclusion results in the serious drawback that all future parts become excluded after a function has been bound to a specific part.

Consider for example, a function that finds an element in a list. In theory, the structure of the function is independent of the types of the elements of the list. All that is required of a search function is that it iterate through the elements of the list and compare each element in the list with the item being searched for. Thus it should be possible to use a generic search function that is independent of the data types of the elements of the list. However, current programming practice often results in such a search function being rewritten—once for each type of data in the list.

Consider as another example, an object that can draw itself on both computer display as well as a printer. It has generally been found to be difficult to create such a function using current object-oriented software programming principles because even though the display and print functions have great similarities, it is common for objects to be limited to a specific type of output device.

FIG. 4 illustrates the type-based coupling problem. If a part A uses a part B, then it cannot be used with a third part C except in situations where there is an a priori relationship that makes part C resemble part B. Thus, once a data type is named within a software component or part, that part becomes coupled to that main type and cannot be reused in the absence of the named data type. Furthermore, the part can thereafter operate only on other parts of the same data type. In analytic terms this can be expressed by the pair of relationships:

$$\text{Excludes}(T)=\text{NOT }(\Sigma(\text{named in T})) \quad (2)$$

$$\text{Includes}(T)=\Sigma(\text{named in T}+\text{Includes}(\text{named in T})) \quad (3)$$

where T is the data type.

In object-oriented programming languages, some constructs are available to minimize this type-based coupling. At one end of the spectrum is the solution used in the Smalltalk programming language where the type system has essentially been eliminated or reduced to a single class called Object. Consequently Smalltalk has no a priori inclusion or exclusion problem. Any object in Smalltalk can thus be a parameter to any function and every function in Smalltalk requires no specific class except the object class.

At the other end of the spectrum is the approach used in the C++ programming language which has an extensive and restrictive typing system. The inclusion problem is serious one in the C++ programming language because the C++ compiler now requires extensive knowledge about the implementation of each named class. This inclusion problem can be alleviated somewhat by defining types that are derived from other types, a technique referred to as inheritance.

As described elsewhere in this patent application, the inheritance technique permits any of the derived types to be used in places where the original type has been named. Thus parts or components that name the original type are coupled only to the original type (called the base type), and are thus independent of any derived types. This programming construct is also called polymorphism. It permits parts to be reused with types that are inherited from an original type without requiring the derived types to be present within the system. This is illustrated in FIG. 3 wherein Part I includes Part A but can be used with Part C also.

The exclusion problem has also posed serious impediments in the use of the C++ programming language. It would be obvious to one skilled in the art that the use of a conservative type system will face the problem of there being greater than linear growth in the number of data types because of the fact that combinations of types require the definition of new types. Thus many of the new types created to satisfy the typing system may differ in actuality from related types only in the fact that they apply to different data types. The C++ language attempts to address the exclusion problem by the use of "templates" which are specifications of parts wherein the types of the named parts are permitted to be parametrized.

The difference between the approaches taken in the Smalltalk and the C++ programming language is that in the former, each part can detect a mismatch between the operations required and the operations present in a part only during the execution of a program (i.e. at run-time), thus resulting in a fatal run-time errors. In contrast, in C++ language, the presence of the operations required and the operations present are compared during compilation, thus permitting the early detection of mismatches. Thus, the C++ approach permits the early detection of errors in contrast to the Smalltalk approach which results in greater programming flexibility and reusability. Thus it can be seen that the strict typing software development model reduces the possibilities for reusability because of the tight coupling between parts.

The problems of coupling and of class explosion in larger systems is slowly being recognized and a variety of approaches to address it are being investigated and implemented. Special tools are being developed to enhance the management of the set of classes. While this may not decrease the total number of classes, it can at least permit a better overview of the problem.

As explained in the glossary of terms, polymorphism is a technique that allows objects of different classes to be manipulated using the same messages. Polymorphism can increase the localization of code because objects of different classes can now be treated as if they all belonged to the same (base) class.

In practice, however, it is very difficult to oversee all future possibilities in the base class and define them as virtual methods. Further, inheritance can create strong coupling that is often not desired. For example, a Shape object and a Car object have very little in common and so creating a common base class just for the purpose of localization is an artificial construct that only increases the coupling between the objects.

Templates allow a designer to parameterize a function or a class using types as parameters. During compilation, such a template is expanded using different parameters. This technique increases the localization of the code, but it still requires great foresight on the part of the programmer in designing the right templates. Furthermore, code size increases considerably when this technique is used and additionally, this technique can only be used at compile time.

Run-time identification of classes facilitates the run-time manipulation of classes and thus offers good potential for simplifying generic code. However, the coupling will still be strong when this technique is used because the identification of classes is not anonymous. In addition, each function that takes advantage of run-time type identification still needs to be aware of all possible classes. Further, run-time type identification does not permit a function to adapt itself to a new type.

Code generation from higher-level definitions is yet another option that is mainly used in the communications industry. Standards specified in languages like Abstract Syntax Notation One (ASN.1) and Generic Definitions of Managed Objects (GDMO) can almost be "read" by a computer and turned into C++ code. This minimizes the effort needed to write code but creates classes that are very difficult to extend and hard to use. In addition, this technique also results in voluminous code.

The data representation problem that is addressed and solved by the Data Object of the present invention is a very important problem to which two classes of solutions are known to exist. Compilers for ASN.1 and IDL programming languages are available that generate source code to create a programming system representation for the information.

There are two classes of solutions to the data representation problem. The first class of solutions aim to create a new class for each possible user-defined type. The source code generator then defines the types and generates the code to create instances of that type, manipulate the instances and destroy the object when it is no longer needed. However, this solution does not alleviate the problem of typing but instead makes the problem considerably worse by introducing a plethora of new types.

The second class of solutions aim to create a common class called Value and derive the different value types from this base class as shown in FIG. 5. The Value class as it is handled by the programming system can then represent the type of the value. In contrast with the Data Object of the present invention, under the second class of traditional solutions, the instances of these classes represent the value directly. In contrast, with the Data Object of the present invention, instances of the meta-type classes represent user-defined types and not values.

The second class of solutions has some similarity to the Data Object of the present invention, but still suffers from several disadvantages, especially in the C++ programming language. In the C++ programming language, the object must always be passed as a reference because that is the only way polymorphistic messages are permitted to be sent. This introduces a considerable amount of work for the programmer in keeping track of the pointers. It also makes implementation of garbage collection and/or reference counting schemes significantly harder.

Meta information, i.e., information about composition of the values is harder to represent. If the meta information is stored in each instance, it imposes a significant computational and resource overhead. The alternative approach of storing the information in the class of the object requires a special class for every sub-type. Since classes are constructed by the compiler, creation of new data types during run-time is difficult if not impossible.

SUMMARY OF THE INVENTION

It is therefore a primary object of the present invention to permit the decoupling of objects in an object-oriented programming environment using standardized interfaces wherever possible. It is a further object of the present invention to provide efficient decoupling techniques based upon considerations of performance and flexibility and upon economic constraints.

It is also an object of the present invention to facilitate a reduction in the replication of code segments within a software program by encapsulating the data accessed by program logic within a new type of object called the Data Object. It is an additional object of the present invention to permit the development of open distributed interoperable software system architectures that can make it easier for businesses to operate externally developed standard application software interchangeably with software products that are developed in house.

A method for reducing the coupling between objects in an object-oriented programming environment is described. The programming environment comprises a computer system containing a processing unit, a memory unit, an I/O (input/output) unit and an operating system. A group of objects is first created, each of the objects being capable of communicating with a Data Object.

Two or more of the group of objects are selectively combined to create one or more software program modules. The software modules are linked to each other and to the operating system of the computer to create an executable software application program. The software application program is executed on the computer system, with all invocations of an object in the software application program being processed through the Data Object.

Furthermore, all interactions of an application program object with other objects, other application programs or with the operating system of the computer are also routed through the Data Object.

BRIEF DESCRIPTION OF THE DRAWINGS

A more complete understanding of the method and system of the present invention may be obtained by reference of the detailed description of the preferred embodiments that follow, taken in conjunction with the accompanying drawings, wherein:

FIG. 23 illustrates an exemplary meta-type implementation using the Data Object invention of the present application that shows the hierarchy of classes;

DESCRIPTION OF THE PREFERRED EMBODIMENT

Component Orientation

One solution for minimizing coupling between objects and to decrease the number of classes is to create a new object that can act as any possible type. It has also been found desirable for this new object to also automatically convert between types and allow an user to query the composition of the object type at run-time.

In the preferred embodiment of the present invention, this is achieved by describing the information about data types in meta-types. Fundamentally, each data type can be viewed as a composition derived from five basic types: Strings, Numbers, Arrays, Structures and Unions. Each of these basic types can be represented with a meta-type class where each instance of this meta-type class further represents a user-defined data type. The meta-type class that has now been defined for each basic type describes the behavior of data associated with a user-defined type.

Figure 1:
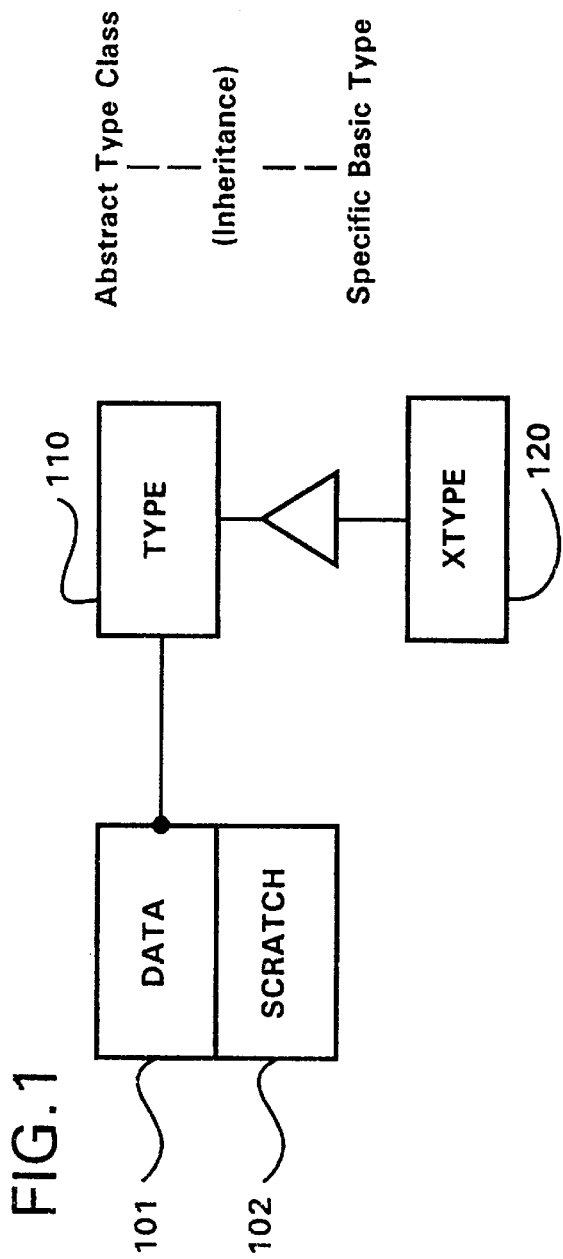
FIG. 1 is an illustrative diagram showing the hierarchy of an exemplary object class.
Figure 2:
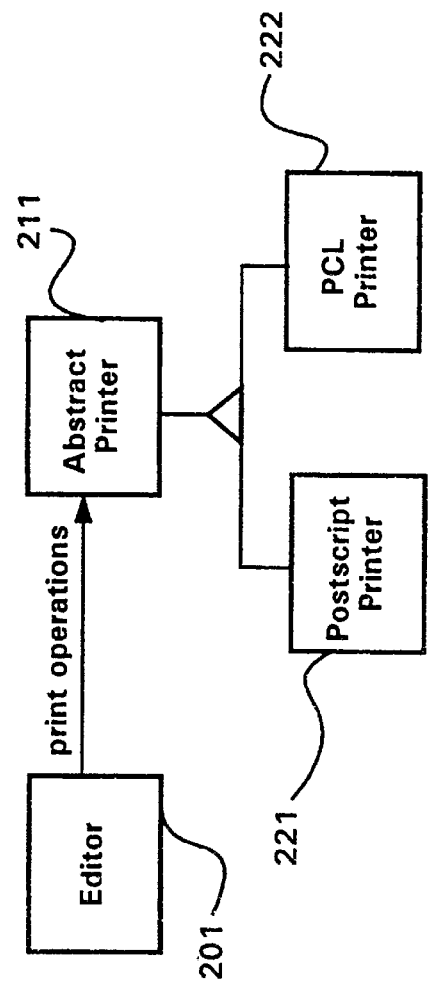
FIG. 2 depicts the notion of inheritance in object-oriented programming environments.
Figure 3:
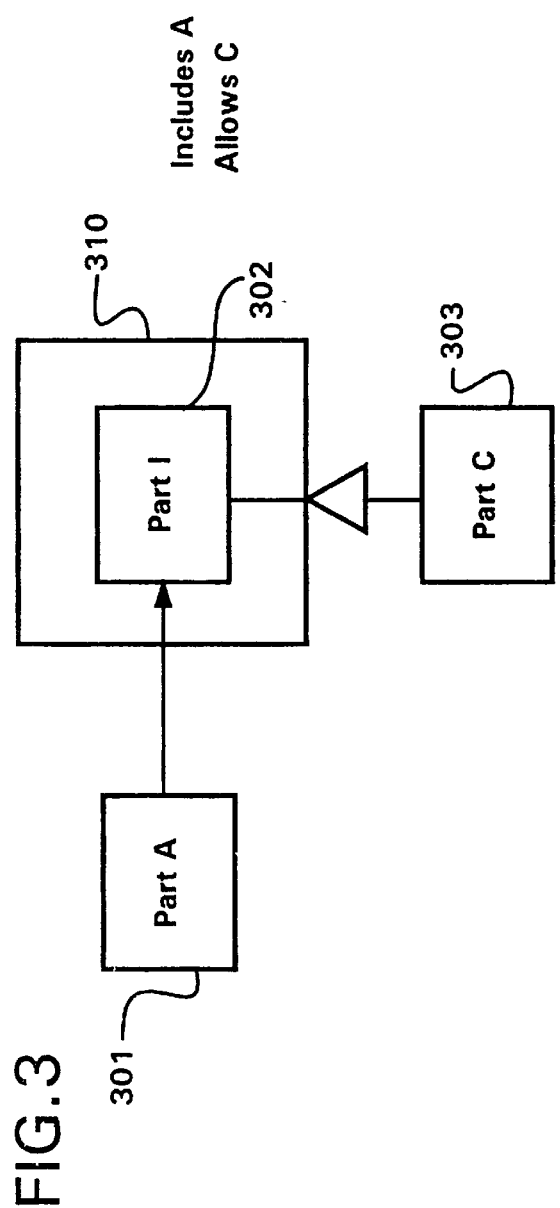
FIG. 3 illustrates the polymorphism technique.
Figure 4:
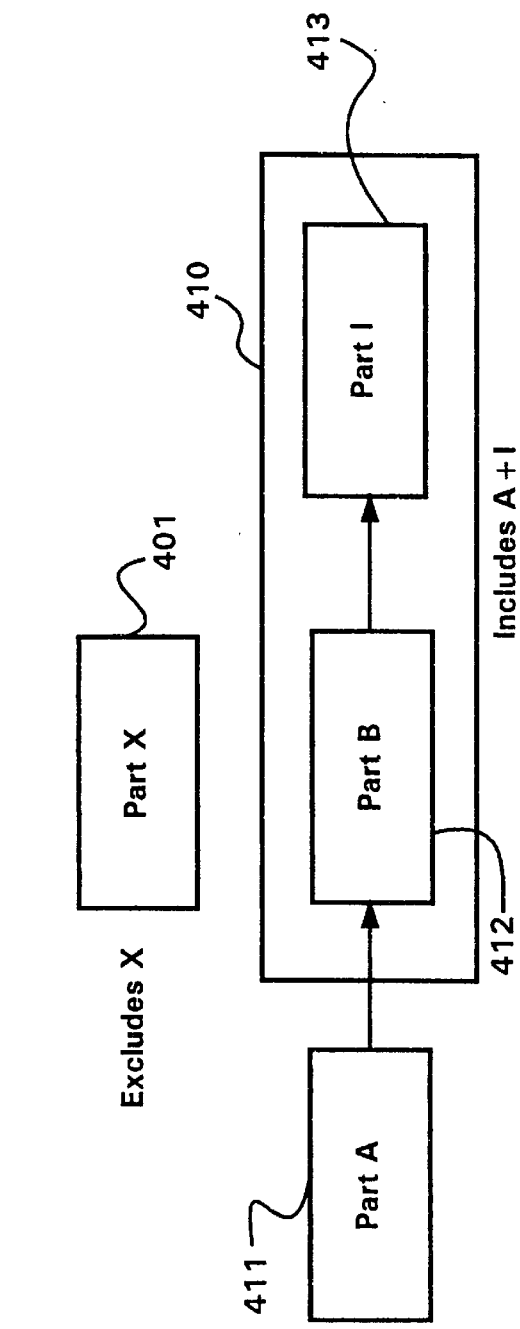
FIG. 4 illustrates the type-based coupling problem.
Figure 5:
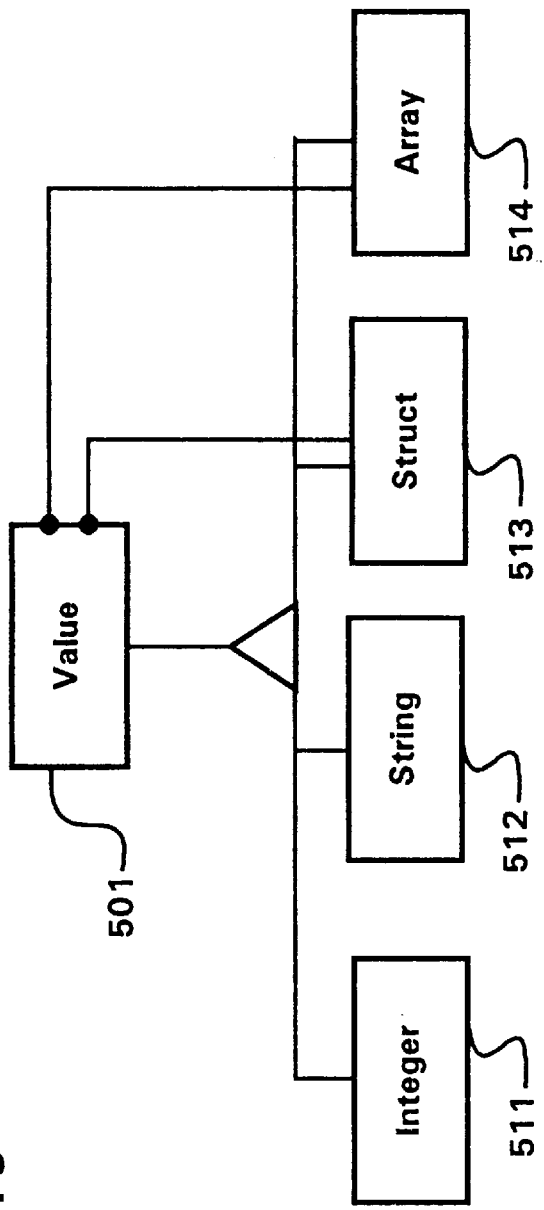
FIG. 5 illustrates class of solutions to the data representation problem where different value types are derived from a base Value class.
Figure 6:
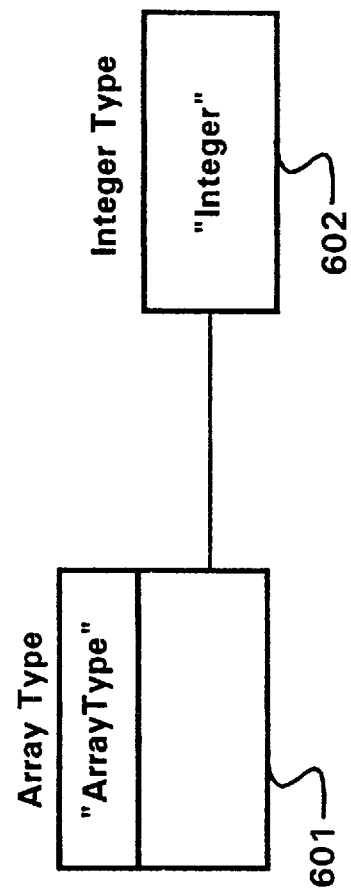
FIG. 6 is an illustrative diagram showing the hierarchy of an exemplary object class.

For example, as shown in FIG. 6, a user-defined type called "Integer" can be represented as an instance of the "ArrayType" class. This user-defined type instance can contain the name "Integer" and a pointer to the type that is held in the array. This type is again a user-defined type and can thus be represented as an instance of the class Integer Type. This instance is only permitted to hold the name "Integer".

As described earlier, classes can represent any possible user-defined type, but they do not contain any values. To hold the value of a user-defined type, a new object is needed. This object is implemented in the present invention as a distinct class called "Data Object". The function of this new object is to hold the value of a user-defined type and refer to a type class that can manipulate the value.

While there may be many type classes, only one Data Object class is permitted. Programs manipulate the Data Object and the Data Object forwards these requests to the associated type object. The value part of the Data Object is never interpreted by the Data Object itself. Instead this part is fully owned by the instance of the type class. The type classes implement methods for constructing, destructing, copying, converting and accessing information from this value object. All type classes share this common set of methods but of course the implementation differs for each class.

In principle, a Data Object contains the same methods as the type classes, but in the implementation of the present invention, these methods are optimized to integrate smoothly with the fundamental types as defined in the programming language used so that the Data Object becomes integrated with the language and can be used almost everywhere that a native data type can be used. The Data Object implements a set of methods that overlap with the meta-type class. Each of these methods invokes a similar method in the associated meta-type instance using itself as a parameter. Further, because the Data Object can be treated as a value object, it can manage its memory usage efficiently and without any additional effort from the programmer. The Data Object can efficiently handle all the memory management tasks because all accesses to the data go through the Data Object. Thus the present invention permits different meta-types to implement different strategies for memory management.

The methods defined in the Data Object and the type classes are orthogonal. They implement functionality for all possible basic types. This implies that a Data Object can be used improperly without being detected by the compiler. Some potential errors can thus be caught only at run-time.

The methods to handle simple types as Strings and Numbers are straightforward. A Data Object can be assigned or converted to a String or a Number. The String and Number are stored in the value part of the Data Object. The Array Type contains a pointer to a deferred type and maintains a list of Data Objects in the value part of the Data Object.

The Structure and Union type classes require named access to their fields. This field is identified by a Label object and the Data Object includes methods that allow access by labels and allow interrogation to determine what labels are present.

Types can be defined by instantiating instances of the types classes and connecting them. This instantiation can be done either at run-time, allowing the dynamic import of types, or statically at compile-time. Type definitions can be generated from standard data definition languages like Abstract Syntax Notation One (ASN.1) and the Interface Definition Language (IDL) used as part of the Common Object Request Broker Architecture (CORBA).

An Example

The problem with conventional programming environments, including the C++ language, is the tight coupling between executable instructions and data types. Because of the fact that each executable instruction has to know which data type it is operating on before it is even compiled, the reusability of the same executable instruction on a different data type is severely restricted.

For example, if a programmer wants to call a function f(A), the programmer must first define the type of the variable A before asking the compiler to translate the above program into a set of processor instructions. A could be an integer, a real number, a string or a more complex type like a record, but it can not be more than one of these types. This rule places a severe restriction on the reusability of the function f(A) because the function cannot be used for differing data types than those for which it was originally defined.

In today's complex programming environment, maintaining understandable modularity in programs, making maintenance easy, and reducing code size are the greatest challenges facing every software designer. However, because of the above mentioned tight coupling problem, numerous functions and instructions need to be duplicated in order to serve and operate on each different data type.

This creates a severe maintenance problem especially if a need arises in the future to add or modify functionality in the above procedures or functions, because all such procedures or functions will then need to be changed. Further, it creates a code size problem unnecessarily because this technique encourages generation of several different procedures or functions that all effectively perform the same function.

The present invention proposes a solution to minimize the above-mentioned coupling restrictions by creating a new type that can act as any possible type. In one embodiment of the present invention that relates to the C++ programming language, this new type is itself made into an object, called the Data Object. Using this newly created type, only one finding function is needed to service all possible different types of data. A simple illustration of this concept is described below.

Assume that we want to implement a function, find( ), to find an employee from a list of employee records. Each employee record could be defined as shown in TABLE 2 below.

TABLE 2

Structure of an Exemplary Employee Record

| Employee: | Record = | |
|---|---|---|
| | Name: | string [20]; |
| | Address: | string [30]; |
| | Age: | integer; |
| | Salary: | real; |
| | end; | |

© 1995 Telefonaktiebolaget L M Ericsson (publ)

The above employee record contains four fields: a name field that of the string data type containing the employee's name; an address field that is also of the string data type containing the employee's address; an age field of the integer data type containing the employee's age; and a salary field of the real data type containing the employee's current salary.

Currently, if we want to find an employee record by its name value, we would have to call a function that can handle the string data and that knows how to find a name in the Employee record. If we wanted to find an employee record from the age of an employee, we would have to call a function that can handle integer data and that knows how to find the age field in the Employee record. Furthermore, if we wanted to find an employee record matching a salary, we would have to call a function that can handle real data and that knows how to find a salary value in the Employee record. Thus we see that we would need different functions to find the different fields in the above employee record example.

The actual coding of the above tasks becomes more complex as well. For example, an implementation of the above example in pseudocode could look as shown in TABLE 3 below.

TABLE 3

Pseudocode Analogous to C++ Implementation

```
input ("What field do you want to find?", field);
input ("What field value are you looking for?", value);
if field = "name" then call findByName (Employee_list, value);
if field = "address" then call findByAddress (Employee_list, value);
if field = "age" then call findByAge (Employee_list, value);
if field = "salary" then call findBySalary (Employee_list, value);
```

© 1995 Telefonaktiebolaget L M Ericsson (publ)

All of the functions, findByName, findByAddress, findByAge and findBySalary, effectively perform the same algorithm as shown below in TABLES 4A to 4D.

TABLE 4A

Pseudocode for findByName Function

```
function findByName (list Employee_list, string name)
    for each element e in list
        if string e.name is equal to name then return e
    return e not found
```

© 1995 Telefonaktiebolaget L M Ericsson (publ)

TABLE 4B

Pseudocode for findByAddress Function

```
function findByAddress (list Employee_list, string address)
    for each element e in list
        if string e.address is equal to address then return e
    return e not found
```

© 1995 Telefonaktiebolaget L M Ericsson (publ)

TABLE 4C

Pseudocode for findByAge Function

```
function findByAge (list Employee_list, integer age)
    for each element e in list
        if string e.age is equal to age then return e
    return e not found
```

© 1995 Telefonaktiebolaget L M Ericsson (publ)

TABLE 4D

Pseudocode for findBySalary Function

```
function findBySalary (list Employee_list, real salary)
    for each element e in list
        if string e.salary is equal to salary then return e
    return e not found
```

© 1995 Telefonaktiebolaget L M Ericsson (publ)

It is obvious that all of the functions findByName, findByAddress, findByAge and findBySalary are very similar, differing only in the type and the field that they each access. Each of these four functions is only a specific combination of a field and the type of that field. Note that C++ templates cannot be used to achieve the same result as that shown in TABLE 4 because they do not allow parametrization of attributes.

In one embodiment of the present invention, because of the loose coupling between data types and functions, the above coding can be implemented in a much simpler fashion as shown in TABLE 5 below.

TABLE 5

Generic Find Function Interface Pseudocode

```
input ("What field do you want to find?", field);
input ("What field value are you looking for?", value);
call findOnField (list, field, value);
```

© 1995 Telefonaktiebolaget L M Ericsson (publ)

The generic find function, findOnField, uses the facilities in the list and the value objects to compare the objects in the field that is provided as a parameter to the find function. The pseudocode for this generic find function is shown in TABLE 6 and can be seen to be functionally identical to all four of the find functions used in the C++ implementations shown in TABLES 3 and 4A–D. It should be noted that the findOnField function is fully generic and is not coupled to any particular data type.

TABLE 6

Pseudocode for findOnField Function

```
function findOnField (DataObject list, DataObject value, Label field)
```

TABLE 6-continued

Pseudocode for findOnField Function for each element e in list
    it string e.field is equal to value then return e
return e not found © 1995 Telefonaktiebolaget L M Ericsson (publ)

The use of the new object, Data Object, is a solution that minimizes the coupling between objects and decreases the number of classes. Hence the Data Object also serves as a front-end class for purposes of the present invention, as it can act as any possible data type and is itself an object that can be manipulated. This new object can automatically convert between types and allow users of the object to query the structure in run-time so that a function can adapt itself to the data that it gets.

The present invention is a device to minimize the coupling between the different parts in a single system. The device is an information holder that represents a single type for the programming language, but can represent many different information types to the programmer. This new type which is referred to hereafter as the Data Object consists of two parts: a value and a datum about the composition of the value. The value that the Data Object holds at any given moment is called the actual value.

Data Objects can act as intermediaries between the application code and the reusable components. A Data Object can carry different types of information, but this will not be visible to the programming language because it only sees the Data Object type. The reusable components specify the Data Object as a parameter in their functions while the actual value composition might differ.

Figure 7:
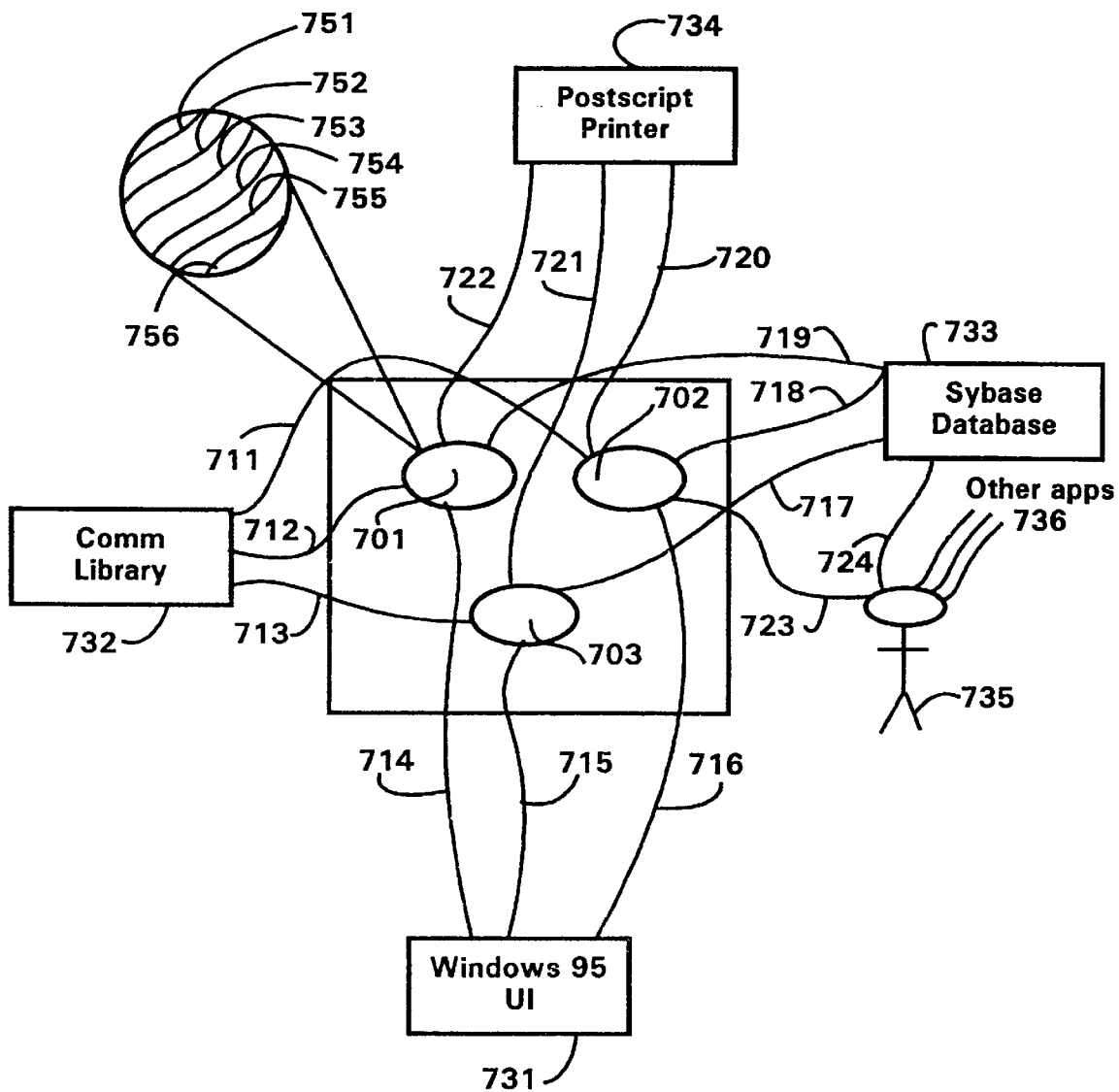
FIG. 7 depicts the object coupling problem, namely, the tangled web of object relationships that commonly arise in traditional object-oriented software programs.
Figure 8:
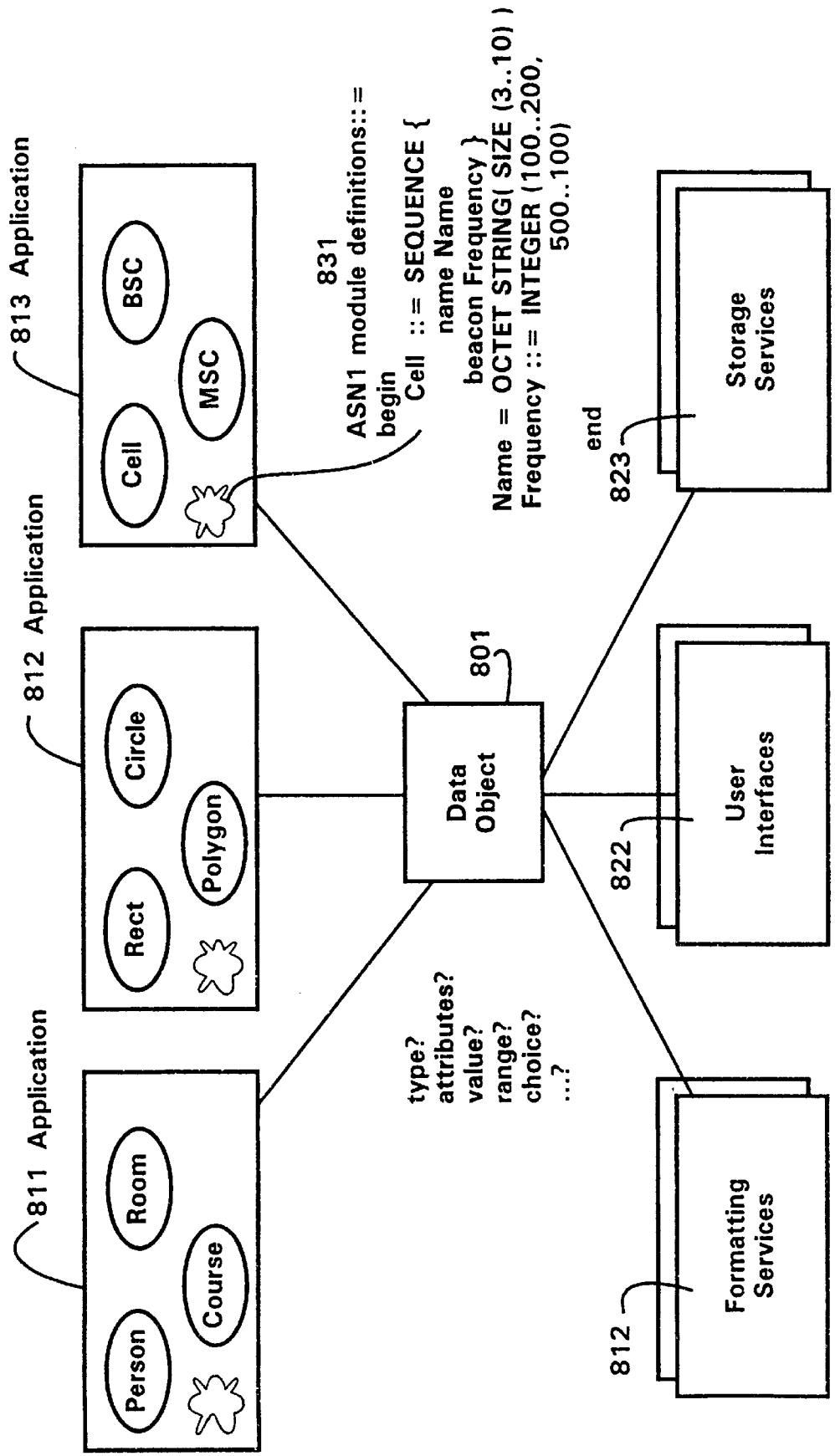
FIG. 8 is a high-level overview of the Data Object invention of the present application.

A nuanced understanding of the present invention can be obtained by reference to FIGS. 7 and 8. FIG. 7 shows the situation that obtains with traditional object-oriented programs. As can be seen from FIG. 7, under current software program development environments, a set of objects representing a person 701, a room 702 and a course 703 may be linked by a web of relationships 711–724 to an user interface 731, a communications library 732, a database application program 733, a printer 734 and/or an user 735. The person object 701 in turn may comprise other objects such as a name 751, a street name 752, a street number 753, an age 754, a marital status 755 and a gender 756.

The web of object relationships 711–724 results in "object spaghetti". Thus, services and application code are normally intertwined, making modification of the code difficult. Further, interface methods require knowledge about all attributes. Consequently, changes in one attribute results in changes being required in every method that is capable of referring to the attribute. In addition, a system designer needs to be aware of all intrinsic aspects of the domain and the services involved.

The intertwined object relationships shown in FIG. 7 can be substantially improved upon by using the Data Object of the present invention, as can be seen from FIG. 8. The use of a meta-type such as a Data Object 801 facilitates a clear separation of applications 811–813 from services 821–823. This permits applications to easily switch between multiple implementations of similar services. The present invention also permits services to adapt to changes by using the metatype information expressed in a Data Definition Language like ASN.1, X.128, etc. An exemplary ASN.1 module definition 831 is shown in FIG. 8.

Figure 9:
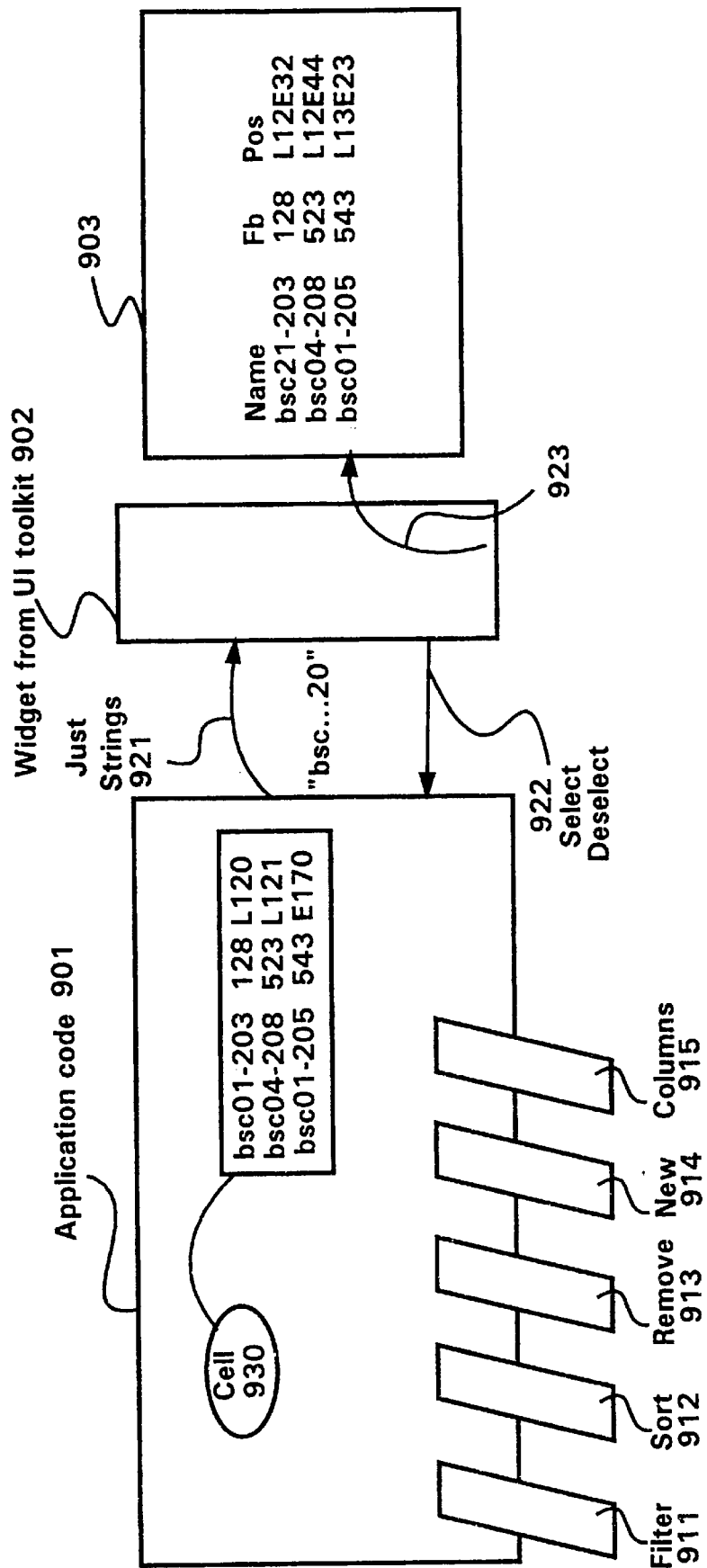
FIG. 9 shows how an exemplary List Widget could be implemented under the traditional object-orientation paradigm.

An exemplary application of the Data Object can be seen by comparing a List Widget as it is commonly implemented under the traditional object-orientation paradigm and under the meta-type-based implementation suggested in this patent application. As can be seen from the traditional List Widget 902 of FIG. 9, the translation from the domain object to string requires extensive knowledge about the attributes of the object. Furthermore, the functions such as filter 911, sort 912, remove 913, new 914, columns 915, etc., are often very similar for different application programs 901 etc. but still need to be modified in order to be usable with different types.

Figure 10:
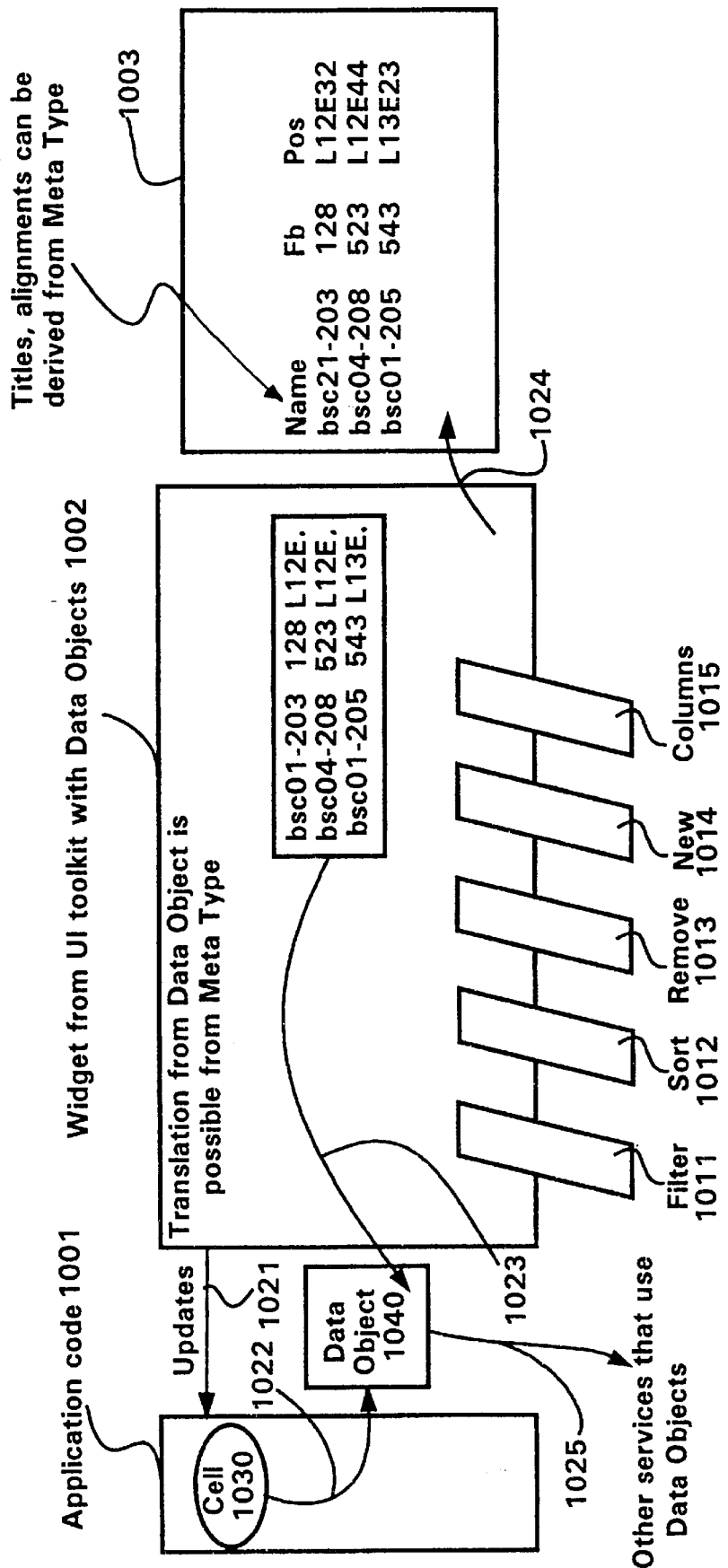
FIG. 10 shows how the exemplary List Widget as it could be implemented using the Data Object of the present invention.

In contrast, a List Widget implemented using meta-types as shown in FIG. 10 permits easy translation from the Data Object 1040. Also, the Data Object 1040 can directly interact with other services. Furthermore, a Generic List Widget 1002 can offer much greater functionality that the Traditional List Widget 902 because it has greater knowledge of the context information. Additionally, the size (and cost) of the Application Code 1001 is substantially reduced.

Figure 11:
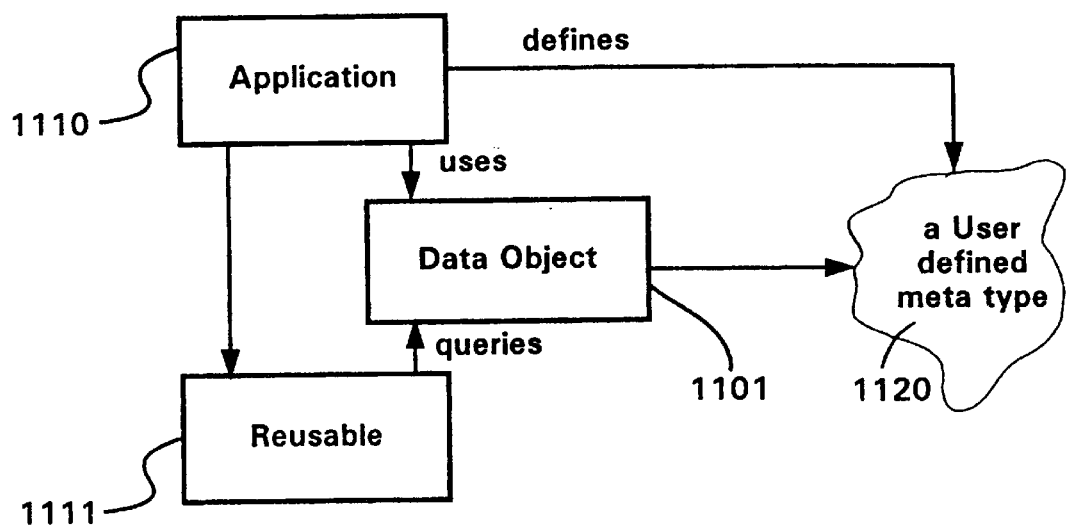
FIG. 11 depicts a reusable function that is coupled to the Data Object but not to the Application Program.

The Data Object itself is self-contained and is minimally coupled. The application code uses both the Data Object and the reusable component, and hence is coupled to both. On the other hand, the reusable function is coupled to the Data Object, but is not coupled to the application program as shown in FIG. 11. The technique described in this patent application achieves the goal of decoupling various interrelated objects. An explanation of how the reusable component actually takes advantage of the information datum in the Data Object is set forth below.

A Data Object has a set of functions that allow the reusable component to inspect the Data Object and adapt itself to the actual value composition of the object. These inspection facilities allow the Data Object to be decomposed in a limited set of types. Each type is described by a special object, called a meta-type. This meta-type will also define the behavior of that type for the Data Object.

Figure 12:
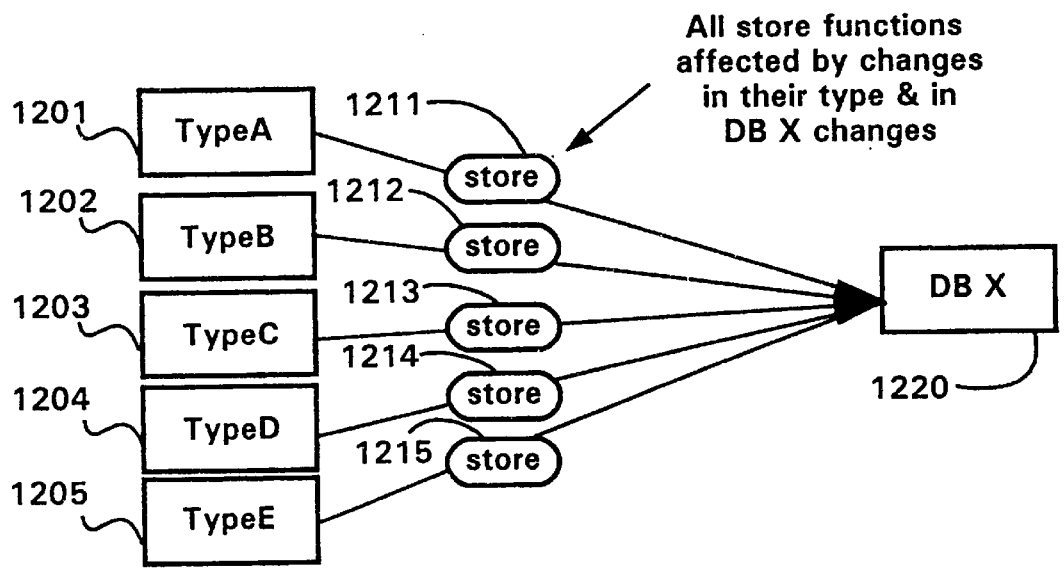
FIG. 12 illustrates a database program developed using the traditional object-oriented approach.

Consider as an illustrative example, the case of a database as shown in FIG. 12. A database needs to be able to store information. Traditionally, an object that needs to be stored in a database has a store function. This function takes each attribute from that object and stores it in the database. This store function is intricately coupled to the type it belongs to because it has to know the set of attributes. Any change in the type of the variable requires a change in the store function. Also, changing the database requires a considerable change in all the store methods used with that database. Such changes need to be implemented in every user-defined type that stores itself. Both these sets of changes require extensive efforts.

Figure 13:
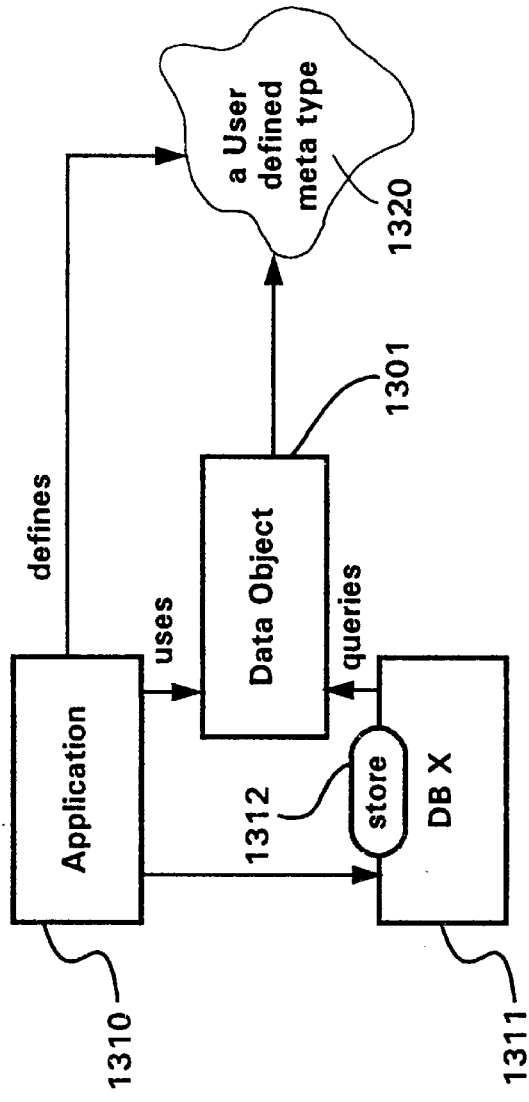
FIG. 13 shows a database program implemented using the Data Object of the present invention.

The use of the Data Object of the present invention allows for a different approach. Instead of associating the store function with a specific user-defined type, a reusable function is created that can store a Data Object in a certain database as shown in FIG. 13. The Data Object carries enough information to allow the function to store the object. The changes required are now quite different. When the structure of the Data Object changes, the store component can automatically adapt itself to the change without requiring additional changes. When a different database is used, a single new store function needs be created that is shared by all types.

Such a Data Object can facilitate a different style of programming. The application code is now used to create user-defined types using a Data Definition Language (such as ASN.1) and the application program will now use reusable components to perform most of its work. The application program assumes responsibility for connecting different components and performs less low-level programming. The information stored in the meta-types is now sufficiently rich to allow components to handle most storage, editing, communications and presentation functions by themselves.

However, every function cannot be defined solely from the information available in the meta-type, and often an application programmer may want to be able to specify extra parameters to define options and properties of some functions. Even in such cases, the use of the Data Object of the present invention can prove advantageous because the present invention permits many intermediate stages to handle the Data Object without becoming coupled to other parts of the program except in exceptional circumstances.

Figure 14:
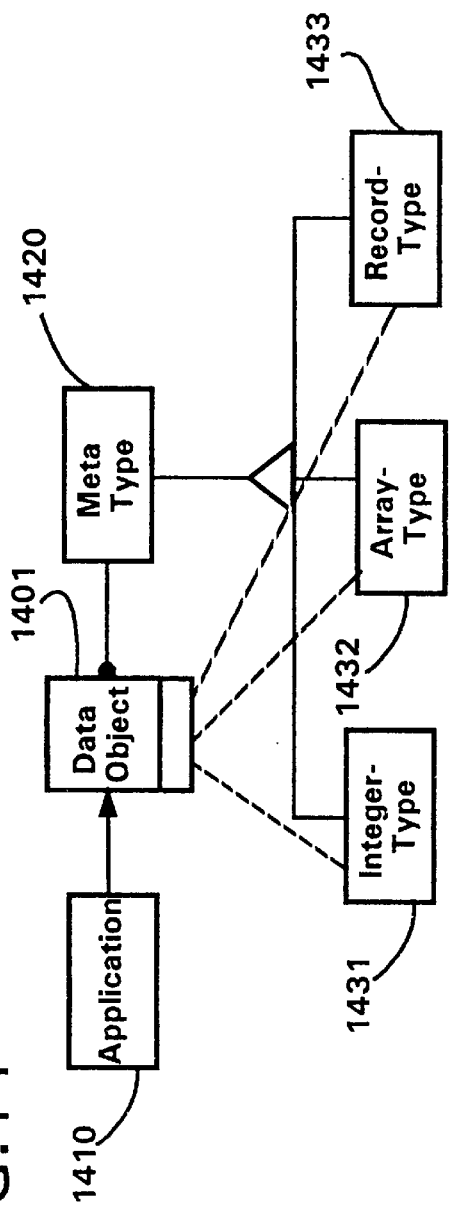
FIG. 14 illustrates the use of the Data Object of the present invention for handling data requests from an application program.

In the preferred embodiment of the present invention, the Data Object is a single programming system type, but has an interface that allows it to be used as any of the possible fundamental types. The Data Object consists of two parts: a first part that is a reference to an instance of a meta-type class and a second part that points to an area inside the Data Object that contains the actual value of the instance. This area is not managed by the Data Object itself. The Data Object forwards all requests to its interface to the meta-type by means of a polymorphistic function. The meta-type then executes the function and generates the requested behavior by using or modifying the actual value in the Data Object as shown in FIG. 14.

For example, if the Data Object were to hold an integer, then the meta-type is an instance of the IntegerType class. All accesses to the Data Object are forwarded to the meta-type —in this case to the object of the IntegerType class. If this Data Object were to be assigned to an integer, the IntegerType instance is then asked to convert the value to an integer. This is simple to do because the integer is directly stored in the value part of the Data Object and this value is directly returned by the Data Object to the requesting entity.

It should be noted that not all functions in the interface of the Data Object can be used with an actual value. Functions are only applicable when the actual value has a composition that is compatible with that function. For example, when the actual value is an integer, a function that is only capable of accessing the $n^{th}$ element is not compatible with it. To prevent these errors, the Data Object can be queried in advance for the composition of the actual value. Such a query interface can also be used to allow the user of a Data Object to adapt itself to the composition of the actual value.

The interface of the Data Object consists of the Life Cycle Handler, the Simple Type Interface, the Access To Elements Segment, and the various meta-types. Each of these is discussed in greater detail below.

The Life Cycle Handler: The value part of the Data Object needs to be managed by the meta-type. Some meta-types only use the value part while other meta-types place a pointer to dynamically allocated memory. Yet other meta-types share information in conjunction with reference counting or garbage collection routines.

By design, the Data Object guarantees the meta-type that it will call a construct method in the meta-type prior to any other call. This construct method can be a default initialize or a clone operation from another object. When the Data Object is destructed, it invokes a destruct method and does not call the meta-type again, except in a new life cycle.

The Simple Types Interface: The Data Object is permitted to request the meta-type for a specific simple type and in one embodiment of the present invention, it is left to the discretion of the meta-type whether to convert the actual value to the requested simple type or to generate an error.

The Access to Elements Segment: Several types may require access to their constituent elements by name, e.g., a structure that contains named elements, a bit string that contains named bits, a choice set from which a named selection is invoked or an invocation of an enumerated type that requires one name out of a set of values.

To minimize the size and complexity of the interface, in one embodiment of the present invention, the Data Object uses the same constructions to access all its constituents. In one implementation, the meta-types that require named access contain a list of label instances. Each label instance comprises a name, a reference to another meta-type, a default value and optional information about that constituent element. In the preferred embodiment of the present invention, a meta-type providing the named access facilities permits an user to specify the constituent by a reference to the label, or to a string that is matched against the names in the labels or to the index of the label.

Implementation Examples of Meta-Types: Each meta-type implements only the functions it can handle, with other functions being handled by the base class. Since there are a plenitude of possible implementations for the meta-types, the following meta-type definitions should be construed as providing only a limited set of examples.

Figure 15:
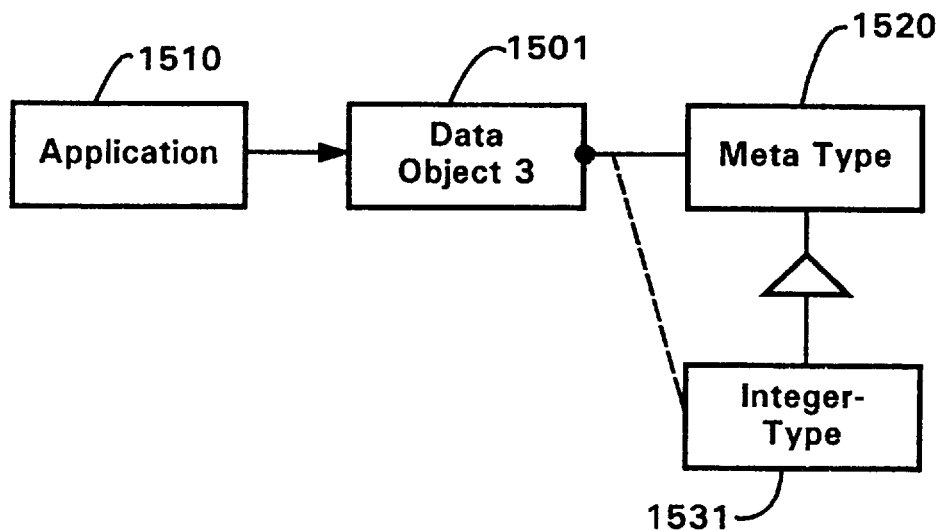
FIG. 15 details the preferred implementation of the Integer and the Boolean meta-types.

Boolean Integer Meta-Type: The Integer meta-type stores the value of the integer in the value area of the Data Object as shown in FIG. 15.

Figure 16:
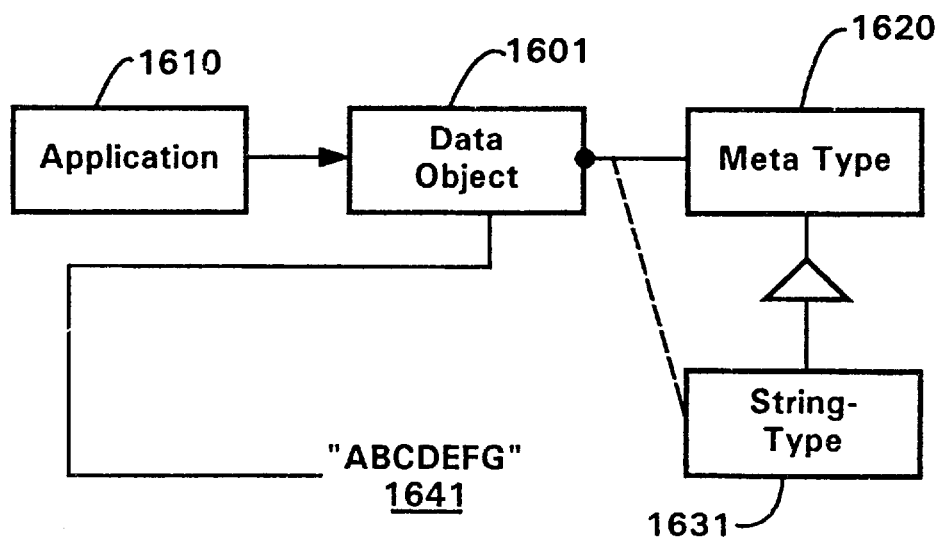
FIG. 16 details the preferred implementation of the String meta-type.

String Meta-Type: The String meta-type stores a pointer to the string in the value part as shown in FIG. 16. Instances of this string class can easily be reference counted because all accesses to the string class have to pass through the String meta-type.

Figure 17:
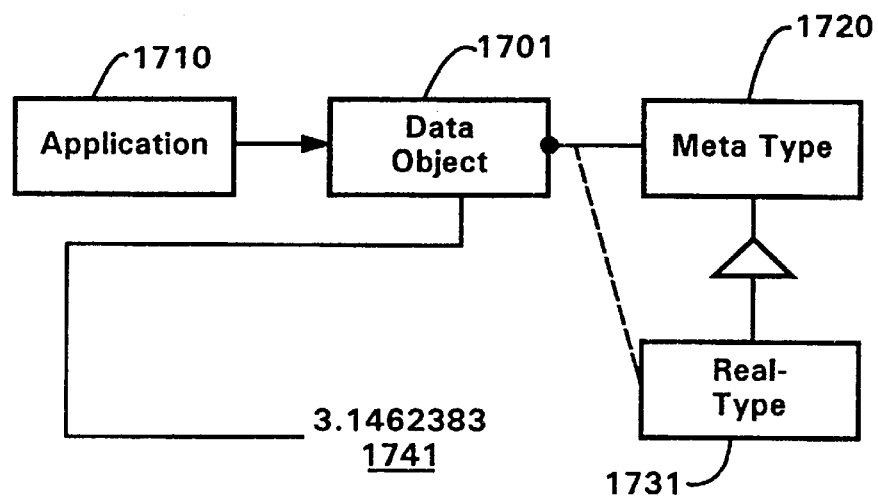
FIG. 17 details the preferred implementation of the Real meta-type.

Real Meta-Type: A pointer to a real is stored in the value part of the Data Object as shown in FIG. 17.

Figure 18:
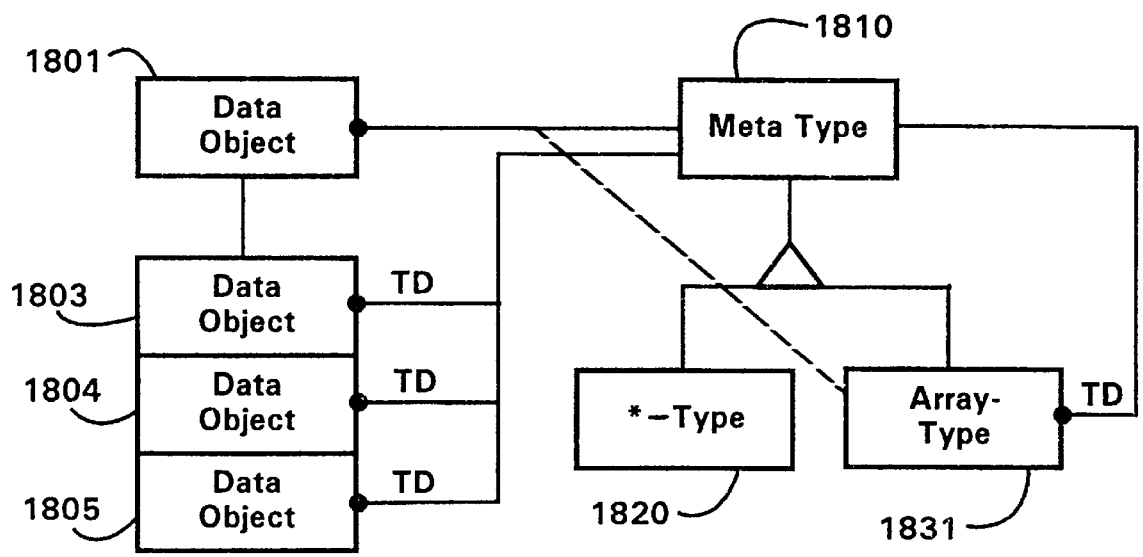
FIG. 18 details the preferred implementation of the Array meta-type.

Array Meta-Type: An array is a list of Data Objects that share a common meta-type. The value area of the Data Object is used to point to an array of data units. Each of these data units can be defined recursively. In the preferred embodiment of the present invention, the array meta-type maintains a pointer to another type as shown in FIG. 18. This is the type that is associated with the Data Objects belonging to the array. Such an arrangement permits new Data Objects to be added or removed.

Figure 19:
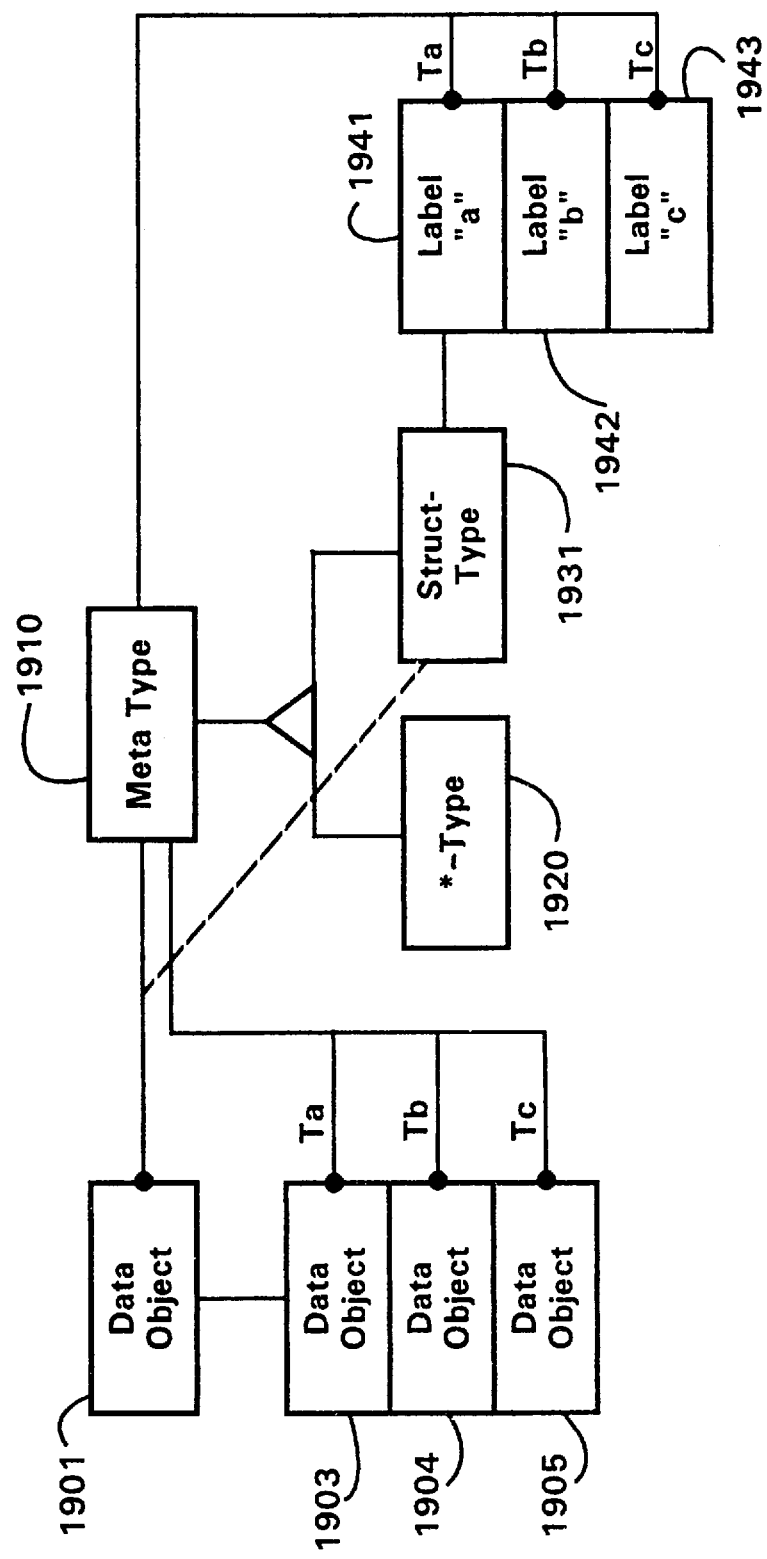
FIG. 19 details the preferred implementation of the Structure meta-type.

Structure Meta-Type: A structure is a list of Data Objects each having its own meta-type. Access to a structure is performed through a name that in turn is accessed through a label object. The structure meta-type comprises a list of label objects, with one label object for each entry in the structure, as shown in FIG. 19. Each label object contains a name for the field, a data type associated with that field, a default value for the field, information regarding whether the field is optional and the tag for the field. The label objects are used by the Structure meta-type to manage the Data Objects in the list based upon the pointer stored in the value part of the Data Object. In the preferred embodiment, the Data Objects are matched to the label objects using an index. The Structure meta-type uses the labels to access the descendent Data Objects by their name, index, label, type or tag.

Figure 20:
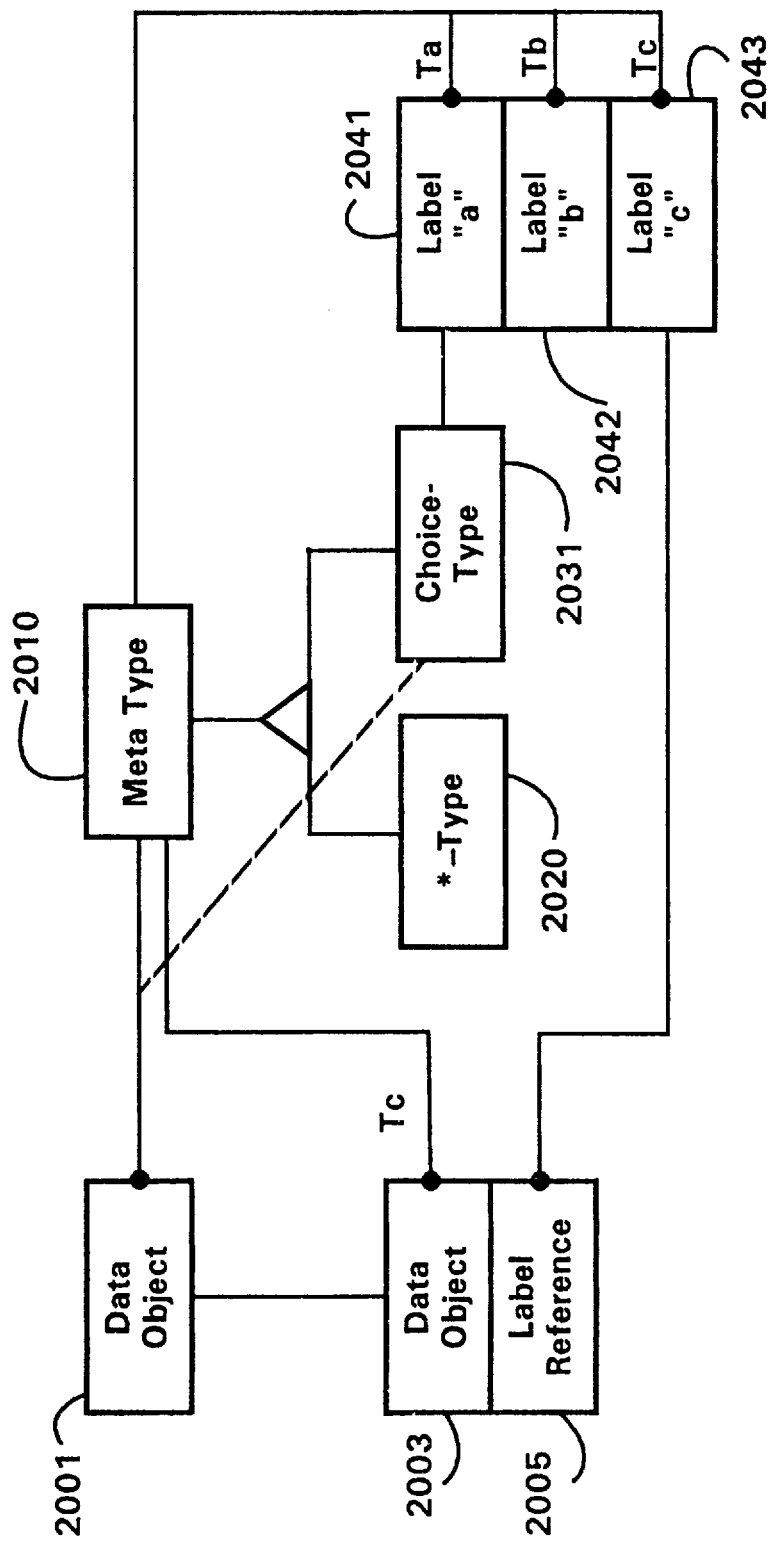
FIG. 20 details the preferred implementation of the Choice meta-type.

Choice Meta-Type: A choice value permits a type to be selected from a set of named types. A Choice meta-type is structurally very similar to a Structure meta-type. Like the Structure meta-type, the Choice meta-type too contains a list of labels. The Choice meta-type is different in that the value part of the Data Object now points to a structure that holds both one Data Object as well as to a pointer to a label. The latter pointer indicates which of the possible choices has been selected at a given instant. This is illustrated in FIG. 20.

Figure 21:
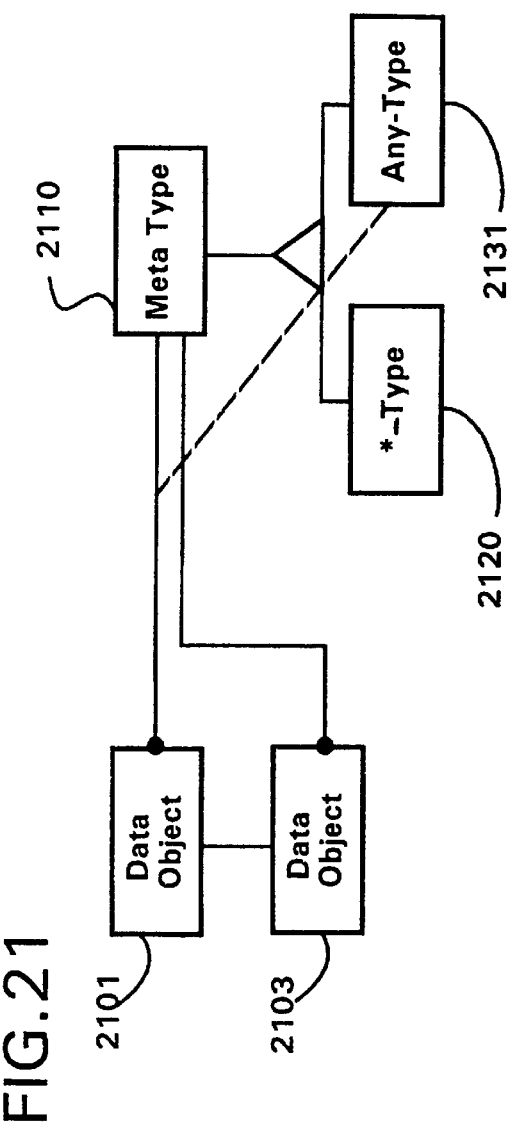
FIG. 21 details the preferred implementation of the Any meta-type.

ANY Meta-Type: A Data Object of the ANY type contains a pointer to another Data Object. In the preferred embodiment of the present invention, all requests to the first data unit are automatically forwarded to the second data unit, except for requests that merely query the composition of the object which are directly handled by the particular instance of the Any meta-type as shown in FIG. 21.

Figure 22:
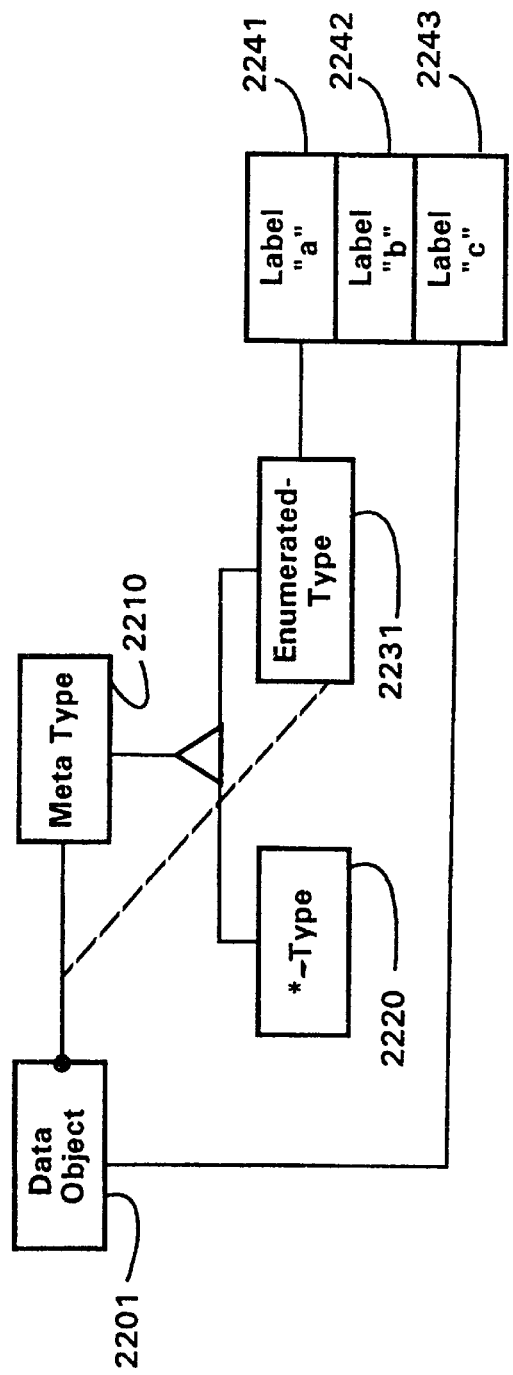
FIG. 22 details the preferred implementation of the Enumerated meta-type.

Enumerated Meta-Type: An Enumerated type permits the selection of one value from a set of named values as shown in FIG. 22. In the preferred embodiment of the present invention, the Enumerated meta-type uses the same technique as the Structure meta-type and the Choice meta-type with the difference that the value part of the Data Object now points only to a label that identifies the current selected enumeration. The default value stored in the label is the integer value.

Based upon the above meta-type specifications, we can now discuss the construction of the meta-types. The instances of the meta-types can be created by a programmer either at run-time or from a specification in a Data Definition Language file that is read in from a database or other external medium or format. A compiler can either read such a file at run-time and create the required network of meta-types and labels, or it can create a source code file that is included in the system. Such a source code file can then make meta-type information available to users (programmers).

The system and method of the present invention is incorporated in the BluePrint™ programming environment that has been developed by applicants' assignee and related corporate entities. BluePrint™ is a host platform for developing software for telecommunications network management. Further details about the BluePrint™ programming environment may be found in the BluePrint™ Programmer's Guide that was attached as Appendix A to the prior provisional U.S. Patent Application entitled SYSTEM AND METHOD FOR DECREASING COUPLING BETWEEN FUNCTIONS AND ACTUAL DATA TYPES, Ser. No. 60/005,497, filed on Oct. 16, 1995 in the names of Peter KRIENS, Stefan EISSING and Håkan BJÖRK.

Figure 24:
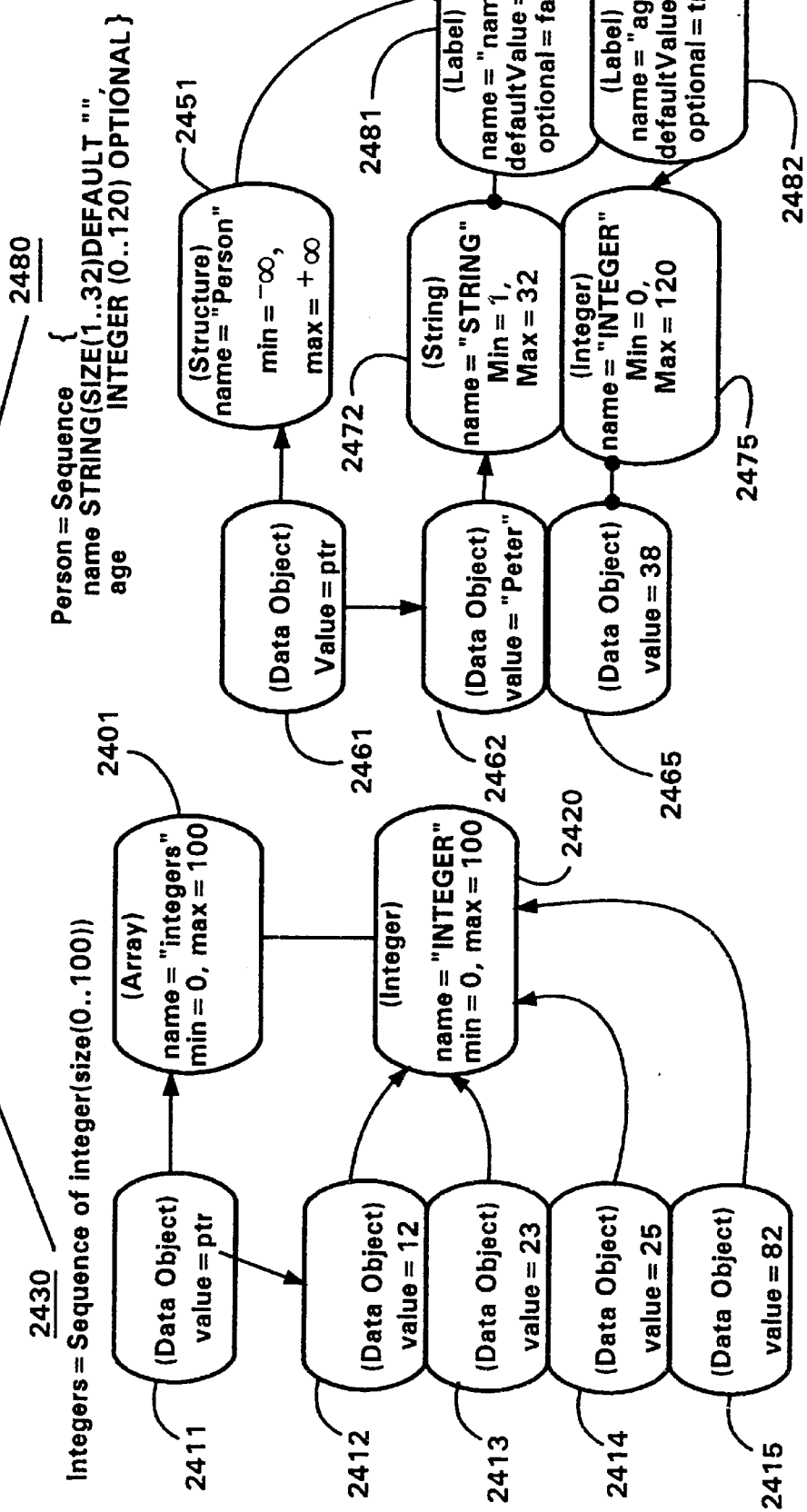
FIG. 24 illustrates the organization of an Array object and a Structure object along with their ASN.1 specifications.

FIGS. 23 and 24 show an exemplary meta-type implementation using the Data Object invention of the present patent application. FIG. 23 depicts the hierarchy of classes. The Data Object 2301 has only four interface categories: numeric, string, indexed or labeled. All requests for data to or from an Application Program 2311 are serviced via the Data Object 2301 in conjunction with the meta-type 2310.

FIG. 24 shows the structure of two instances—an Array object 2401 and a Structure object 2451 along with their ASN.1 descriptions 2430 and 2480, respectively. As explained earlier, the Data Object 2411 corresponding to an Array object 2401 contains a pointer to a set of Data Objects 2412–2415 that are all of the same type. In contrast, the Data Object 2461 corresponding to a Structure object 2451 contains a pointer to a set of Data Objects 2462–2465 that may each be of a different type 2472–2475.

Further, the details of implementation of the Data Object can be found in the BluePrint™ Kernel Source Code that was attached as Appendix B to the prior provisional U.S. Patent Application entitled SYSTEM AND METHOD FOR DECREASING COUPLING BETWEEN FUNCTIONS AND ACTUAL DATA TYPES, Ser. No. 60/005,497 filed on Oct. 16, 1995 in the names of Peter KRIENS, Stefan EISSING and Håkan BJÖRK. Further details about the present inventions can also be found by reference to the BluePrint™ Managed Object Layer Source Code that was attached as Appendix C to the prior provisional U.S. Patent Application entitled SYSTEM AND METHOD FOR DECREASING COUPLING BETWEEN FUNCTIONS AND ACTUAL DATA TYPES, Ser. No. 60/005,497, filed on Oct. 16, 1995 in the names of Peter KRIENS, Stefan EISSING and Håkan BJÖRK. The contents and concepts that are either expressly or inherently contained within the above-identified source code listings of Appendices B and C or in the BluePrint™ Programmer's Guide of Appendix A are all hereby incorporated by reference herein into this nonprovisional U.S. Patent Application.

Advantages of the Present Invention

The merits of the present invention arise from the fact that it facilitates the reusability of source code. The data front-end class splits software application programs into two parts: a part that is sensitive to the semantics of the information and a part that is independent of the meaning of the information. The semantics-sensitive part will not differ substantially from that in use in present object-oriented software systems.

The advantage of the present invention principally derives from the generic part. Services can be defined that only use the generic part and which are therefore ipso facto reusable. While a service is bound to the Data Object, the Data Object can exist without the specific service. Such a decoupling technique allows applications to selectively invoke only the services that they need.

The present invention also considerably simplifies the design and implementation of APIs. In traditional object-oriented software design, it has been necessary to define the types of every object that is passed as a parameter. Using the present invention permits all these different types to be replaced—in most instances—by a Data Object referring to the appropriate meta-type. This makes APIs easier to read because each API can now focus on the service that it performs, rather than on the data type or types that it performs this service for.

An additional advantage of the present invention is that it minimizes dependencies between programmers by permitting inputs and outputs to be now specified as Data Objects (i.e. as a specific interface) rather than as specialized classes. The traditional practice has been to create stub files that mimic the behavior of the final class—a time-consuming task. Furthermore, filling a Data Object with test data is now rendered much simpler. Printing a Data Object—one of the basic services in any programming environment—is also made easier. The use of a Data Object has been demonstrated to increase the parallelism in large complex software development projects.

The C++ language puts the burden of memory management on the implementor whenever data allocation is involved. The task of memory management can become a substantial part of the code. The Data Object invention that is the subject matter of the present application can also handle almost all the tasks of memory management. It has been found in practice that the Data Object is just as easy to use as an integer data type.

The present invention also reduces version dependencies by making the coupling between objects less tight. Adding fields to a structure can be invisible to a code that is not aware of or sensitive to the structure, and code generated using the present invention also appears "intelligent" because the code can now detect if a specific field is actually being used.

Additionally, data types now appear to be equivalent to instances and can be manipulated at run-time. Different application programs can exchange type information and data types can be stored in the permanent storage of a computing device. The dynamic nature of the types makes it even possible to automatically document an application by printing out all the types in a process. Such debugging facilities can prove very useful in network management software.

Figure 25:
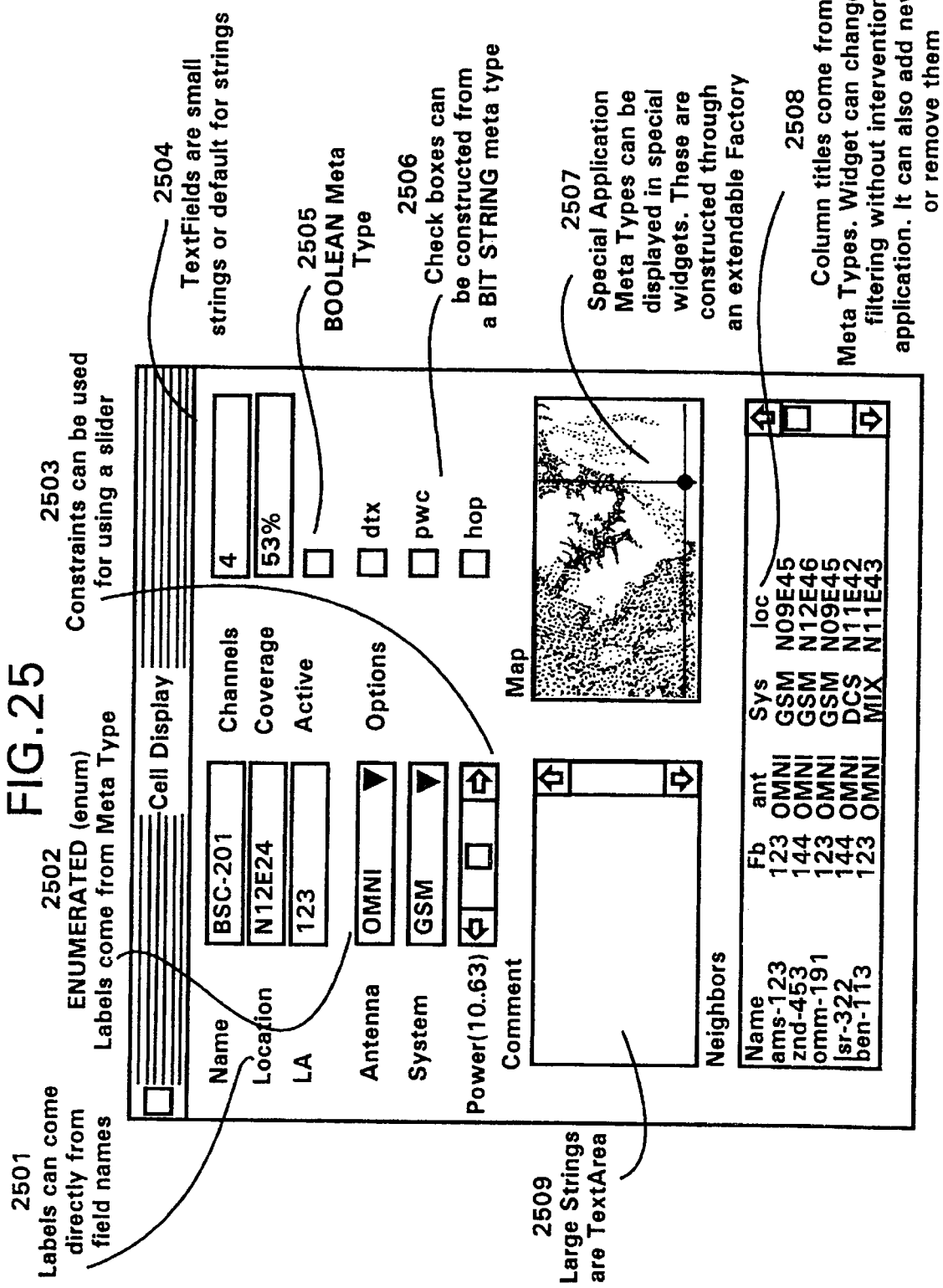
FIG. 25 illustrates the use of meta-types in implementing User Interfaces (UIs)

The utility of meta-types in implementing user interfaces is schematically depicted in FIG. 25. The use of the Data Object invention permits virtually all of the user interface code to be handled by reusable widgets that work with meta-types. This offers numerous advantages over traditional object-oriented approaches to user interface design.

As shown at 2501, labels can now come directly from field names. As shown at 2502, enumerated labels can be obtained from the meta-type. Constraints can directly yield the permissible values of a slider bar as depicted at 2503. Check boxes can be constructed, as at 2506, from a Bit String meta-type. 2507 shows an exemplary Special Application meta-type that is displayed in a special widget that is constructed using an extendable widget factory. Further, column titles can be directly obtained from the corresponding meta-type as shown at 2508. Widgets are now capable of offering high-level functionality like type-dependent editing, sorting, presenting, filtering, etc. without intervention by the application program. Widgets can also now add or remove objects automatically.

Figure 26:
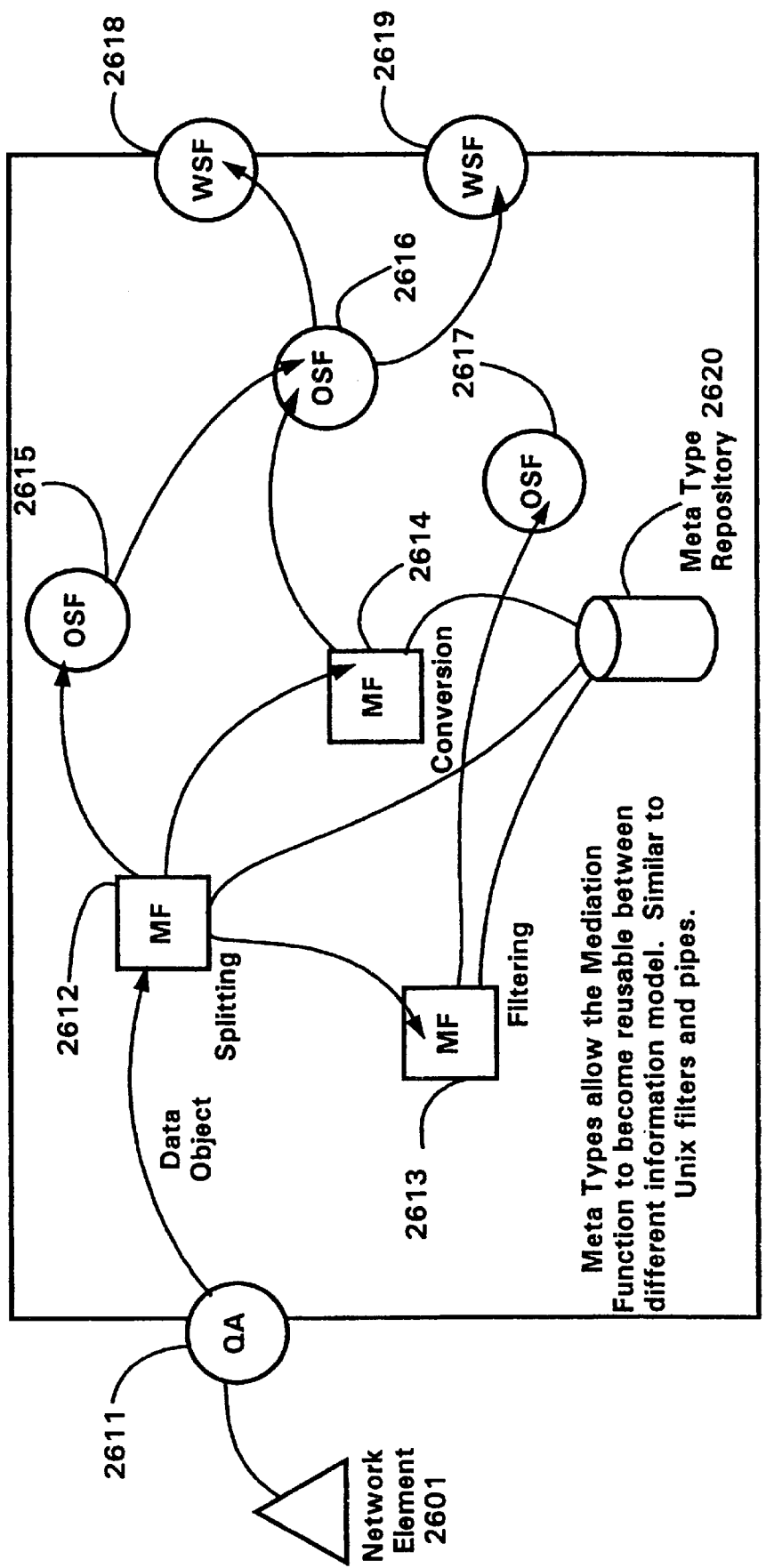
FIG. 26 shows the use of the Data Object invention in implementing telecommunications network management software using reusable components.

FIG. 26 shows the use of the Data Object invention for telecommunications network management. The use of meta-types facilitates the implementation of software for network management using reusable components. Data Objects are an improved way of implementing parts of the Telecommunications Management Network (TMN) standards.

As shown in FIG. 26, the TMN standards partition the network management functions into Work Station Functions (WSFs) 2618–2619, Operating System Functions (OSFs) 2615–2617, Mediation Functions (MFs) 2612–2614, etc. that in turn interact with external Network Elements (NEs) 2601 via standardized QA interfaces 2611. In the TMN model, different MFs may serve different functions like splitting, filtering or conversion. Meta-types allow various MFs to become reusable between different information models. Thus they can become similar in operation to filters and pipes in the UNIX operating environment.

Figure 27:
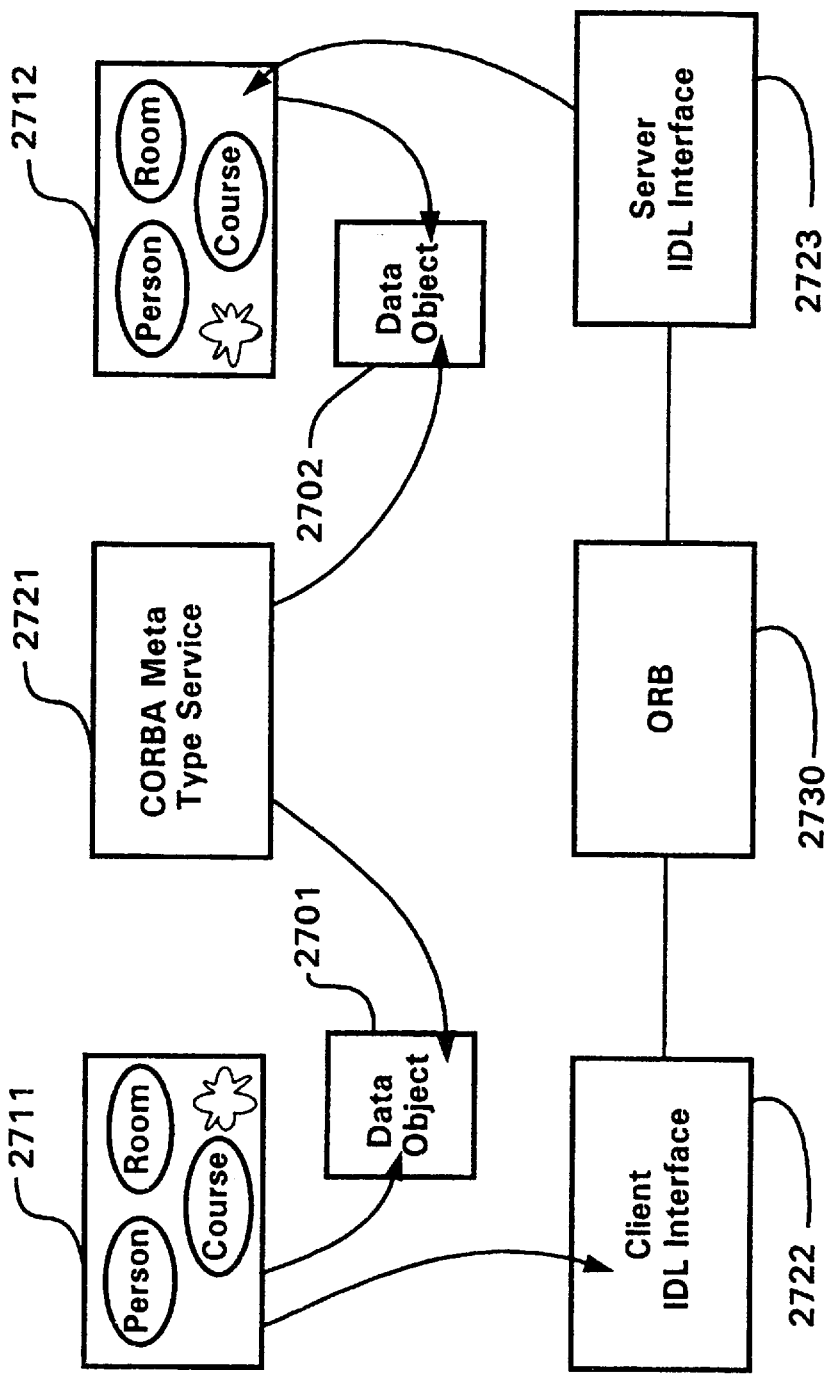
FIG. 27 shows the use of meta-types with the Common Object Request Broker Architecture (CORBA).

FIG. 27 shows the use of meta-types with the Common Object Request Broker Architecture (CORBA). The use of Data Objects 2701–2702 makes CORBA more flexible because CORBA services can now become more generic. Further, the Interface Descriptor Language (IDL) interface does not get cluttered with volatile types. In addition, the IDL interface repository does not contain constraints or type names permitting the object request broker 2730 to function better.

In summary, the use of the Data Object and related type classes as described in the present Nonprovisional U.S. Patent Application can substantially reduce the cost of implementation and maintenance of complex software systems.

Although a preferred embodiment of the method and apparatus of the present invention has been illustrated in the accompanying drawings and described in the foregoing detailed description, it is to be understood that the invention is not limited to the embodiment(s) disclosed, but is capable of numerous rearrangements, modifications and substitutions without departing from the spirit of the invention as set forth and defined by the following claims.

What is claimed is:

1. In an object-oriented programming environment on a computer system comprising a processing unit, a memory unit, an I/O (input/output) unit and an operating system, a method for reducing the coupling between objects in the object-oriented programming environment comprising the steps of:

creating a plurality of objects, each of said objects capable of communicating with a Data Object;

selectively combining two or more of said plurality of objects to create one or more software program modules;

linking said one or more software modules with each other and with the operating system of said computer to create an executable software application program; and executing said software application program on said computer system, said step of executing said software application program further comprising the steps of:

processing each invocation of each of said objects in said software application program through said Data Object; and processing each interaction of each of said objects in said software application program with other objects in said software application program, with other software application programs or with the operating system of said computer through said Data Object.

2. In an object-oriented programming environment on a computer system comprising a processing unit, a memory unit, an I/O (input/output) unit and an operating system, a method for reducing the coupling between objects in the object-oriented programming environment comprising the steps of:

creating a plurality of objects, at least one of which is a Data Object;

selectively combining two or more of said plurality of objects to create one or more software program modules;

linking said one or more software modules with each other and with the operating system of said computer to create an executable software application program; and executing said software application program on said computer system by processing communications between said plurality of objects through said Data Object.

3. In an object-oriented software system, a method for reducing the coupling between components using a Data Object as a container for passing information between said components, said Data Object being of a single object type, and having the following additional characteristics:

said Data Object being capable of holding values that are a recursive composition of a defined and small set of fundamental types;

said Data Object being amenable to efficient access and retrieval when the composition of an actual value contained in said Data Object is known;

the composition of said Data Object being capable of being queried during the execution of a software program without requiring prior knowledge of said actual value contained in said Data Object;

accesses to said actual value being delegated to an object that maintains descriptive information about the actual type and which is an instance of a meta-type class, and each fundamental type being correlated to a different class that defines the behavior of the fundamental type by implementing the applicable polymorphistic messages for that fundamental type; and the information about the composition further containing information for using said actual value in different contexts, such information encompassing, but not being limited to, user-defined type names, constraints on said actual values and named information for accessing the descendant values that a value is composed of.

4. The method of claim 3 further comprising a technique for generalizing the description of a data definition specification whereby the same descriptive objects are used to describe the selection in a choice type, said actual value in an enumerated type, the accesses to a field in a structure, and the accesses to the bits in a bit string, said technique further defining an object type named Label, wherein the instances contain a name and a reference to a meta-type object.

5. The method of claim 3 wherein the set of fundamental types is as defined in the ASN.1 standard.

6. The method of claim 3 wherein the set of fundamental types is as defined in the OMG IDL standard.

7. An implementation in the C++ language of the method of claim 3 wherein the following characteristic is added:

the program reads an ASN.1 module definition and creates a source file for a programming system containing a function that can create the meta-type classes structure that models the appropriate module definition for the invention.

8. An implementation in the C++ language of the method of claim 3 wherein the following characteristic is added:

the program reads an IDL module definition and creates a source file for a programming system containing a function that can create the meta-type classes structure that models the appropriate module definition for the invention.

9. An implementation in the C++ language of the method of claim 3 wherein the following characteristic is added:

the program accepts a Data Object and converts said actual values to a set of SQL commands for storing the Data Object in a database.

10. An implementation in the C++ language of the method of claim 3 wherein the following characteristic is added:

the program accepts a Data Object conforming to the ASN.1 standard and prints out the contents in ASN.1 value syntax.

11. An implementation in the C++ language of the method of claim 3 wherein the following characteristic is added:

the program accepts a meta-type conforming to the ASN.1 standard and reads in an ASN.1 value from a file.

12. An implementation in the C++ language of the method of claim 3 wherein the following characteristic is added:

the program accepts a Data Object conforming to the ASN.1 standard and prints out the contents in ASN.1 Basic Encoding Rule (BER) syntax.

13. An implementation in the C++ language of the method of claim 3 wherein the following characteristic is added:

the program accepts a meta-type conforming to the ASN.1 standard and reads in an ASN.1 BER value from a file.

14. An implementation in the C++ language of the method of claim 3 wherein the following characteristic is added:

the program accepts Data Objects, keeps a plurality of them in memory and allows them to be retrieved by specifying a list of names and values matching an object present in the cache.

15. An implementation in the C++ language of the method of claim 3 wherein the following characteristic is added:

a user interface program that accepts a description of the requested user interface in a data unit and interfaces with the application using data units, where all components in the user interface are capable of receiving and sending Data Objects.

16. An implementation in the C++ language of the method of claim 3 wherein the following characteristic is added:

a user interface program that accepts a meta-type object and creates a graphic user interface program that can view and edit any Data Object associated with that meta-type.

17. An implementation in the C++ language of the method of claim 3 wherein the following characteristic is added:

a program that accepts a list of Data Objects and can sort these objects in the order as defined by a list of labels.

18. An implementation in the C++ language of the method of claim 3 wherein the following characteristic is added:

a program that converts a Data Object conforming to the OMG IDL specification to an IDL structure and vice versa.

* * * * *